US006778100B2

(12) United States Patent
Schempf

(10) Patent No.: US 6,778,100 B2
(45) Date of Patent: Aug. 17, 2004

(54) CONDUIT NETWORK SYSTEM

(75) Inventor: Hagan Schempf, Pittsburgh, PA (US)

(73) Assignee: Automatika, Inc., Pittsburgh, PA (US)

( * ) Notice: Subject to any disclaimer, the term of this patent is extended or adjusted under 35 U.S.C. 154(b) by 0 days.

(21) Appl. No.: 10/383,114

(22) Filed: Mar. 6, 2003

(65) Prior Publication Data

US 2003/0167919 A1 Sep. 11, 2003

Related U.S. Application Data

(60) Provisional application No. 60/362,131, filed on Mar. 6, 2002.

(51) Int. Cl.7 .................................................. H04Q 9/00

(52) U.S. Cl. ............................. 340/870.07; 340/870.11; 73/861.23; 73/861.77

(58) Field of Search ....................... 340/870.07, 870.11; 73/861.23, 1.16, 1.35, 14, 861.77; 137/825

(56) References Cited

U.S. PATENT DOCUMENTS

| | | | | | |
|---|---|---|---|---|---|
| 4,674,338 | A | * | 6/1987 | Carpenter | 73/861.77 |
| 5,004,014 | A | * | 4/1991 | Bender | 137/624.12 |
| 5,502,652 | A | * | 3/1996 | Hoggatt et al. | 702/136 |
| 5,636,653 | A | * | 6/1997 | Titus | 137/14 |
| 5,838,258 | A | * | 11/1998 | Saar | 340/870.11 |
| 6,654,697 | B1 | * | 11/2003 | Eryurek et al. | 702/47 |

* cited by examiner

*Primary Examiner*—Timothy Edwards
(74) *Attorney, Agent, or Firm*—Webb Ziesenheim Logsdon Orkin & Hanson, P.C.

(57) ABSTRACT

A conduit network system includes at least one, and typically multiple, node elements in communication with an inner area of a conduit, which is used to transfer material therein. The node element can receive, process and communicate data signals that are representative of user-desired information. A system control mechanism is in communication with the node elements and receives the data signals from these node elements. A method for communicating data in a conduit system is also disclosed.

33 Claims, 18 Drawing Sheets

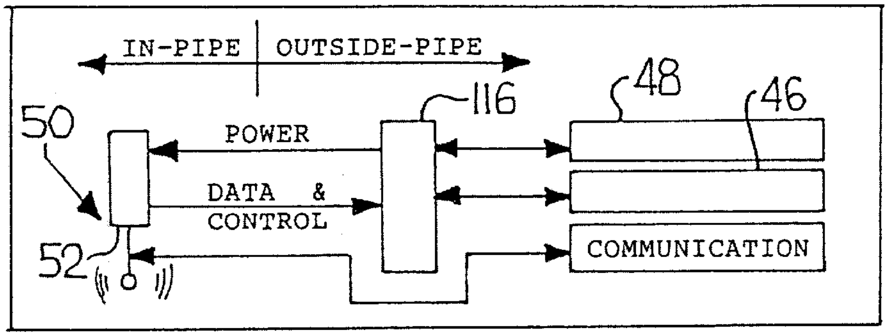
Fig. 18a
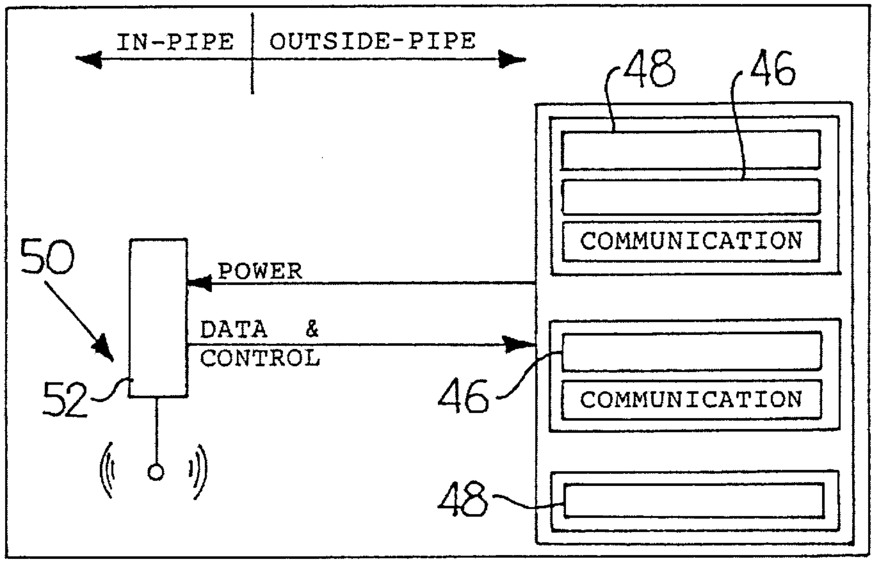
Fig. 18b
Fig. 18c
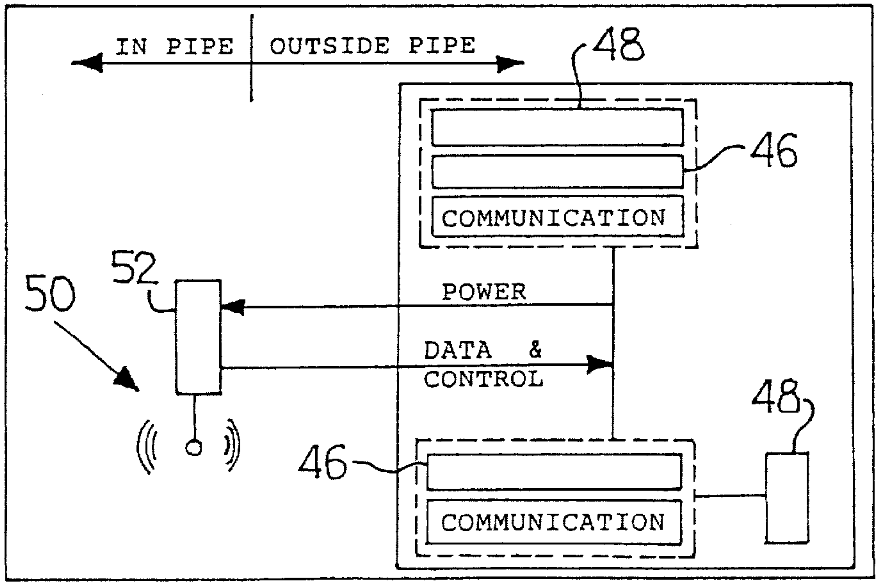

CONDUIT NETWORK SYSTEM

CROSS REFERENCE TO RELATED APPLICATIONS

This application claims the benefit of U.S. Provisional Patent Application Serial No. 60/362,131, filed Mar. 6, 2002.

BACKGROUND OF THE INVENTION

1. Field of the Invention

The present invention relates generally to data collection systems in a conduit network, such as a pipeline network, used for transferring materials from location to location and, in particular, to a system using remote nodes to collect data relating to the conduit network, the material flowing through the conduit network or the areas surrounding the conduit network.

2. Description of Related Art

Conduit networks, whether aboveground or underground and whether old construction or new construction, are used in various applications to transport and transfer material from one location to another location. For example, a conduit network used in a process application would transfer material, such as a liquid or gaseous material, from one process unit or component to another process unit or component. Often, such conduit and distribution networks are underground, thereby preventing the network from interfering with aboveground operations, structures or other units that may be impacted. Therefore, since these conduit networks are underground, collecting information regarding the conduit network, the area surrounding the conduit network and the material flowing through the conduit network is often difficult and requires extensive labor to gain access to the conduit network.

Particular problems arise in public utility applications. Since a utility distribution system must distribute material, such as natural gas or water, to both business and residences alike, such conduit networks are almost universally underground and already in place, such that the conduits or pipelines do not impact the neighboring structures, enclosures, streets, etc. However, since these utility conduit networks are widespread and highly used, the utility provider requires information about the in situ process variables in their distribution network. This information must have sufficient resolutions so as to permit the utility to better manage the infrastructure of the network. When a utility lays out a new network, a computer model of the network is used to predict the pressures and flows in the system. This allows the utility to size compressors and/or storage facilities in order to provide for the necessary flow and pressure of the distributed material. Once installed, however, the only real-time network monitoring (and control) that occurs in the field is typically at the actual pumping/storage facilities. This hampers material distribution infrastructure management efforts.

Currently, natural gas supplies 20 percent of the world's energy needs. In the United States, over one million miles of distribution pipelines carry natural gas to almost sixty million homes, representing over 50 percent of the population. In the Energy Information Administration's Annual Energy Outlook for 1999, forcasted gas consumption by the year 2020 is anticipated to increase by as much as 50 percent. This increase in demand for natural gas will need to be met by a combination of expanded infrastructure and extended use of existing infrastructure. It is economically infeasible to build enough new pipeline to meet this demand. Therefore, the existing and aging infrastructure needs to be managed so as to extend its life and throughput without increasing safety concerns or excessive cost. Also, operators in the gas utility industry presently have little or no information about the operation of their system. This means that such operators are working "blind" when diagnosing problems that arise in the conduit network. Therefore, utilities generally react to problems that have occurred and rely on delayed data from gas dispatchers and customer calls. The operator rarely has information about why a problem occurred and has little operational data that can be used to predict and prevent problems in delivery.

In the particular case of natural gas distribution, pressure and flow variables are used to adjust the supply and demand from the field, which is a basic reactive system approach. Additionally, data from every individual gas meter is collected over time and used for billing in an offline process. Comparison of meter and billed volumes and those measured at the supply centers as having been pumped can give some indication of the state of the network. The power meter industry has allowed electrical utilities to make a phone connection with their meter at each dwelling, thereby reading the consumption regularly with minimal manual effort. Radio frequency connections are used in some instances, but such connections are costly and only used in more major installations. However, this is not a real-time network-wide measure. Gas utilities are beginning to realize the importance of automated pipeline management systems, but have no present and implementable technology.

Overall, there is a need in currently operating and future construction distribution and conduit networks for a complete and accurate real-time data collection and communication system. Such a system should describe the status of the delivery network from the pumping or distribution station to the point-of-sale. In the case of natural gas distribution, this point-of-sale would be the customer's gas meter. Further, such a system should avoid the use of manual labor to collect data from critical points in the distribution network through personnel visits to read data loggers and collect historical operating data. Additionally, such a system should be real-time in data collection, as opposed to the use of off-hour and, hence, non-real-time data. There is a need for a centralized collection, processing and management of remote and distributed data measurements in order to collect and analyze real-time on-demand information, which would result in a substantial improvement in both safety and operational efficiency.

Such real-time process data access over a large network and provided at a central location would help a distribution location or a utility better monitor, control and supply its network with a tailored and configurable approach. Process control of the material supply through the use of real-time data sets would provide information as to size, efficiency and distribution of the material to better balance loads, and would further provide for improved decision-making regarding the expansion or load increase in the future for the network. In addition, such data would allow for instantaneous emergency condition warnings, such as excess flow or pressure, unsafe acoustic noise and/or vibrations, etc. This, in turn, allows for improved detection and reaction and an increase in the safety of the conduit network by reducing third-party damage potential. Also, such a conduit network system can be augmented by, or combined with, a command module allowing for the local activation of sensing actuation devices, which would provide for real-time, centralized control interaction for emergency or maintenance activities. Overall, there remains a need for a conduit network system that increases safety, efficiency and further aids in the distribution networks to meet current and future material consumption needs.

SUMMARY OF THE INVENTION

It is, therefore, an object of the present invention to provide a conduit network system that overcomes the deficiencies of the prior art. It is another object of the present invention to provide a conduit network system that provides a real-time data collection functionality that describes the status of the delivery network. It is yet another object of the present invention to provide a conduit network system that increases efficiency in operations for material distributors, increases the use and management of distribute network information and provides real-time and off-line use of such information in emergency, monitoring and design activities for expanding and upgrading the network to safely meet the demand for the material. It is a still further object of the present invention to provide a conduit network system that provides process control of material supply through the use of collected data in an appropriate command system. It is another object of the present invention to provide a conduit network system that provides information to facilitate predictive maintenance and improve conduit life span. It is a still further object of the present invention to provide a conduit network system that provides information for facilitating improved capacity for the present system. It is yet another object of the present invention to provide a conduit network system that detects safety breaches and third-party interference. It is still another object of the present invention to provide a conduit network system that allows for keyhole installation techniques and node-based data collection, and further allows for both hard-wired, wireless and data extraction device communication between multiple points in the conduit network.

The present invention is directed to a conduit network system for use in connection with a conduit network including multiple lengths of connected conduit for transferring material. The material transferred through the conduit can be in a gaseous, liquid, aqueous, slurry or semi-solid form. The conduit network system includes at least one and typically multiple node elements that are in communication with an inner area of the conduit. The node elements receive, process and communicate data signals that are representative of the user-desired information, which is typically collected at the location of the node element. A system control mechanism is in communication with the node elements and receives the data signals from one or more of these node elements.

In a preferred embodiment, the node elements include a sensor system that is also in communication with the inner area of the conduit. The sensor system is capable of sampling one, and typically multiple, variables of the conduit, the material transferred through the conduit and/or the area adjacent or surrounding the conduit. The sensor system produces data signals that are representative of these variables. These data signals can be representative of flow, pressure, relative humidity, acceleration, temperature, speed, material properties, material analysis, conduit properties, conduit vibration, soil properties, etc.

In another preferred and non-limiting embodiment, the data signals that are received and processed by the node element are communicated to either the system control mechanism, another node element, a data extraction device, a memory storage device, etc. These data signals are transmitted in any number of formats, including wireless, hard-wire, memory medium, radio frequency, acoustic wave, fiber optic, cable, copper cable, telephone line, network line, telecommunications line, infrared and optical. In one embodiment, the data signals are transmitted through the inner area of the conduit in a wireless format, with the conduit serving as a wave guide and wireless communications medium.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIGS. 18(*a*)–(*c*) are schematic views of safety positioning and enclosures for use in connection with a node element according to the present invention;

DESCRIPTION OF THE PREFERRED EMBODIMENTS

Figure 1:
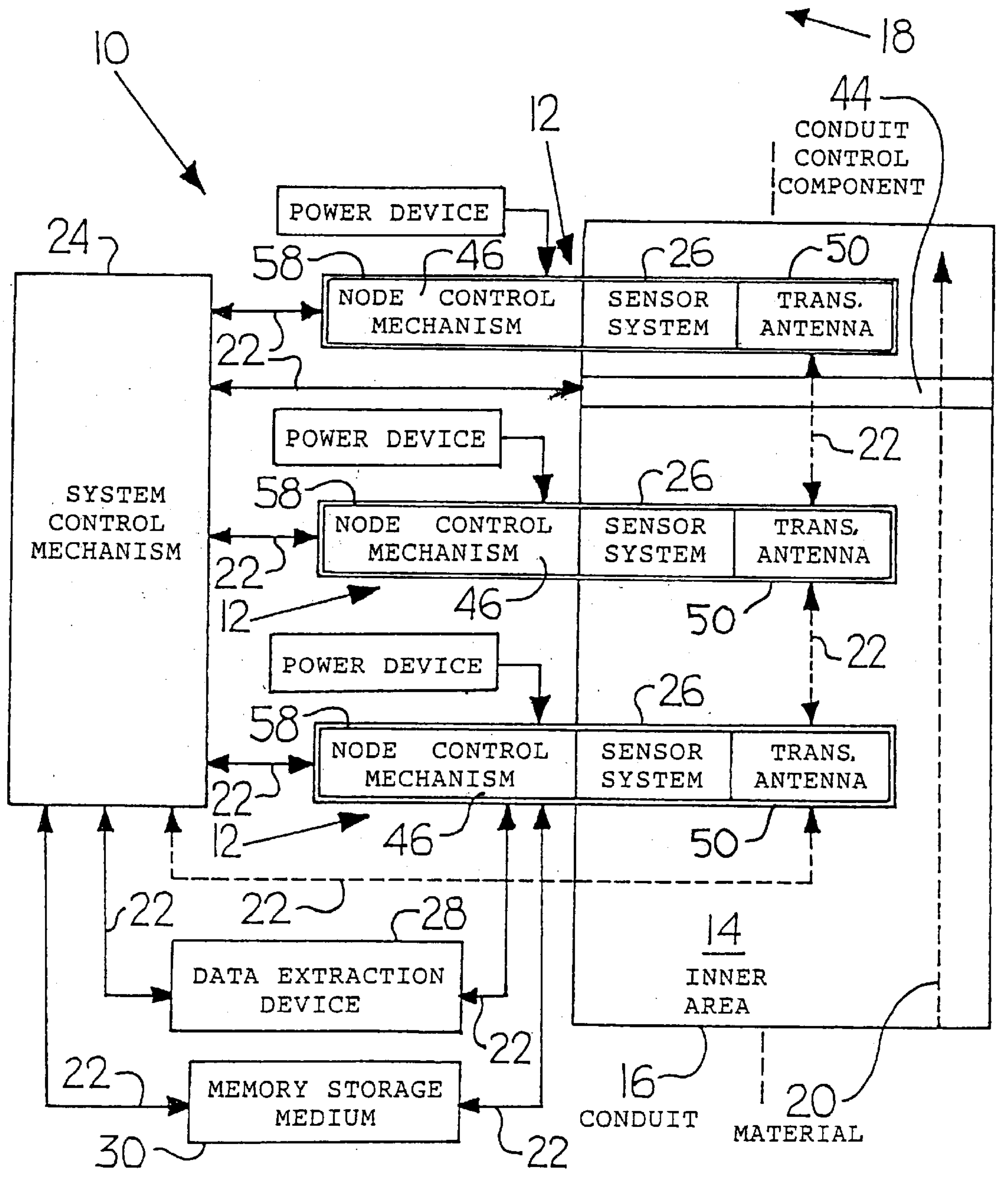
FIG. 1 is a schematic view of one embodiment of a conduit network system according to the present invention.

The present invention is a conduit network system 10 as seen in various embodiments, together with various sub-systems and sub-components as described hereinafter, in FIGS. 1–32. As seen in FIG. 1, the conduit network system 10 includes at least one and typically multiple node elements 12. Each node element 12 is in communication with an inner area 14 of a conduit 16, which is, in turn, part of a conduit network 18, such as a pipeline distribution network. The conduit network 18 is used to transfer or transport material 20 from one location to another location in order to supply this material 20 to various desired points throughout the system. Each node element 12 is positioned in a remote location and receives, processes and communicates data signals 22 that are representative of user-desired information relating to the conduit network 18.

The conduit network system 10 also includes a system control mechanism 24, which is in communication with one or more of the node elements 12. This system control mechanism 24 receives the data signals 22 from the node elements 12. The system control mechanism 24 may be in the form of a personal computing device or other similar data collection device that acts as a central data collection, processing, display and storage location. Further, the system control mechanism 44 can be in direct or indirect contact with the node element 12, and it is envisioned that the system control mechanism 24 be in direct contact with a specified node element 12 acting as a data signal 22 extraction point.

The node elements 12 can be adapted to work in any type of conduit network 18. For example, the material 20 flowing through the conduit network 18 can be gaseous, liquid, aqueous, slurry and/or semi-solid in form. Further, the node elements 12 can be specifically designed for the differing effects of gas immersion as opposed to fluid immersion.

In order to collect data, in the form of the data signals 22, the node element 12 may also include a sensor system 26 having one or more sensor devices that can perform the sampling process in connection with one or more variables. For example, the variables can reflect the physical or chemical attributes of the conduit 16, the material 20 transferred through the conduit 16 and/or an area surrounding the conduit 16, such as, if the conduit 16 is buried, the soil or fill material surrounding the conduit 16. In addition, this sensor system 26 produces data signals that are representative of these physical or chemical variables. Multiple node elements 12 with corresponding sensor systems 26 are placed into the conduit network 18 at multiple, and theoretically an unlimited number of, locations. However, it is not necessary that all node elements 12 include a sensor system 26, and as discussed hereinafter with respect to the communication aspect of the present invention, any one or more node elements 12 may simply be acting as a relay or data extraction node element 12.

One important aspect of the present invention is the communication functionality of the conduit network system 10. The data signals 22 received, processed and transmitted by the node element 12 can be communicated to many different devices in many different formats. For example, the data signals 22 can be transmitted to the system control mechanism 24, another or subsequent node element 12 (which would serve as a relay), sub-components of the node element 12, a data extraction device 28 and/or a memory storage medium 30. Further, the form and format of the communication can be wireless, hard-wired, memory medium, radio frequency, acoustic wave, fiber optic, cable, copper cable, telephone line, network line, telecommunications line, infrared, optical, etc. Therefore, the conduit network system 10 can communicate in a wireless or hard-wired network architecture, or alternatively, can also operate in a hybrid combination of both hard-wired and wireless, for example, via a satellite or pager/cell network, as discussed in detail hereinafter.

When transmitting the data signals 22 in a wireless format, in a preferred and non-limiting embodiment, these data signals 22 are transmitted through the inner area 14 of the conduit 16. Since the Federal Communications Commission does not regulate radio frequency traffic inside of pipes or conduit 16 (in the case that wireless radio waves are used inside a gaseous-containing conduit 16, which is different from using acoustic or othr means for different density media inside the conduit 16), the conduit network system 10 can use advantageous frequencies and power settings without impacting the outside, and typically aboveground, areas. Further, such in situ communications allow the node elements 12 to be self-locating and able to build data-routing maps based on pre-assigned node element 12 identifications. This, in turn, allows the node elements 12 to find the most efficient message relay path back to the system control mechanism 24. In the case of a wireless node element 12 failure, the conduit network system 10 can be reprogrammed to redirect traffic in such a manner as to avoid the defective or "bad" node element 12 and alert the user as to its new route and the presence of a defect in the conduit network system 10.

When using communications in the inner area 14 of the conduit 16, the conduit 16 can be used as a wave guide to focus and send data signals 22 back to a central location, such as the system control mechanism 24, for quasi-real-time viewing. Each node element 12 that is part of the conduit network system 10 can pick up transmissions from other node elements 12 and relay the data signals 22 onward in the path that results in its receipt at the end point. Typically, this end point is a data-extraction node that is part of the system control mechanism 24.

In another preferred and non-limiting embodiment, the node element 12 can transmit data signals 22 to other node elements 12 or even itself and act as a data-extraction node, thereby allowing the data to be sent outside the conduit 16, whether aboveground or underground, through more common techniques, whether hard-wired or wireless. In the case of wireless forwarding, the data signals 22 are sent from the data-extraction node element 12 to a nearby device, typically via a hard-wired connection, where it is then sent onwards via a wireless medium using varying frequencies and protocols that are available in the cell/paging domains. Such a connection may use radio- or cell-phone towers or even satellite links depending upon the remoteness of the location in forwarding these communications to a receiver at the system control mechanism 24.

In the case of hard-wired forwarding, the data signals 22 are sent from the node element 12 to a nearby device, typically via a hard-wired connection, where it is then sent onward using a dedicated phone line or dial-up modem or a hard-wired connection using other protocols typical in the internet-provider or data collection industry. Therefore, the data signals 22 are routed to a connection reserved for the system control mechanism 24. The node elements 12 may also collect the data signals 22 and store these data signals 22 locally in a data-logger fashion and provide access to this information via the data extraction device 28 or the memory storage medium 30, as described above. Further, data access can be offered through standard memory-module extraction, such as the flash memory used in memory cards typical in digital cameras, or even hard-wired or short-range wireless data extraction ports, wherein users can extract the data signals 22 in the field by accessing the node element 12 physically. In this situation, the end-user could extract a memory module, make a connection for a data dump or perform data dumping through a short-range wireless link.

Figure 2:
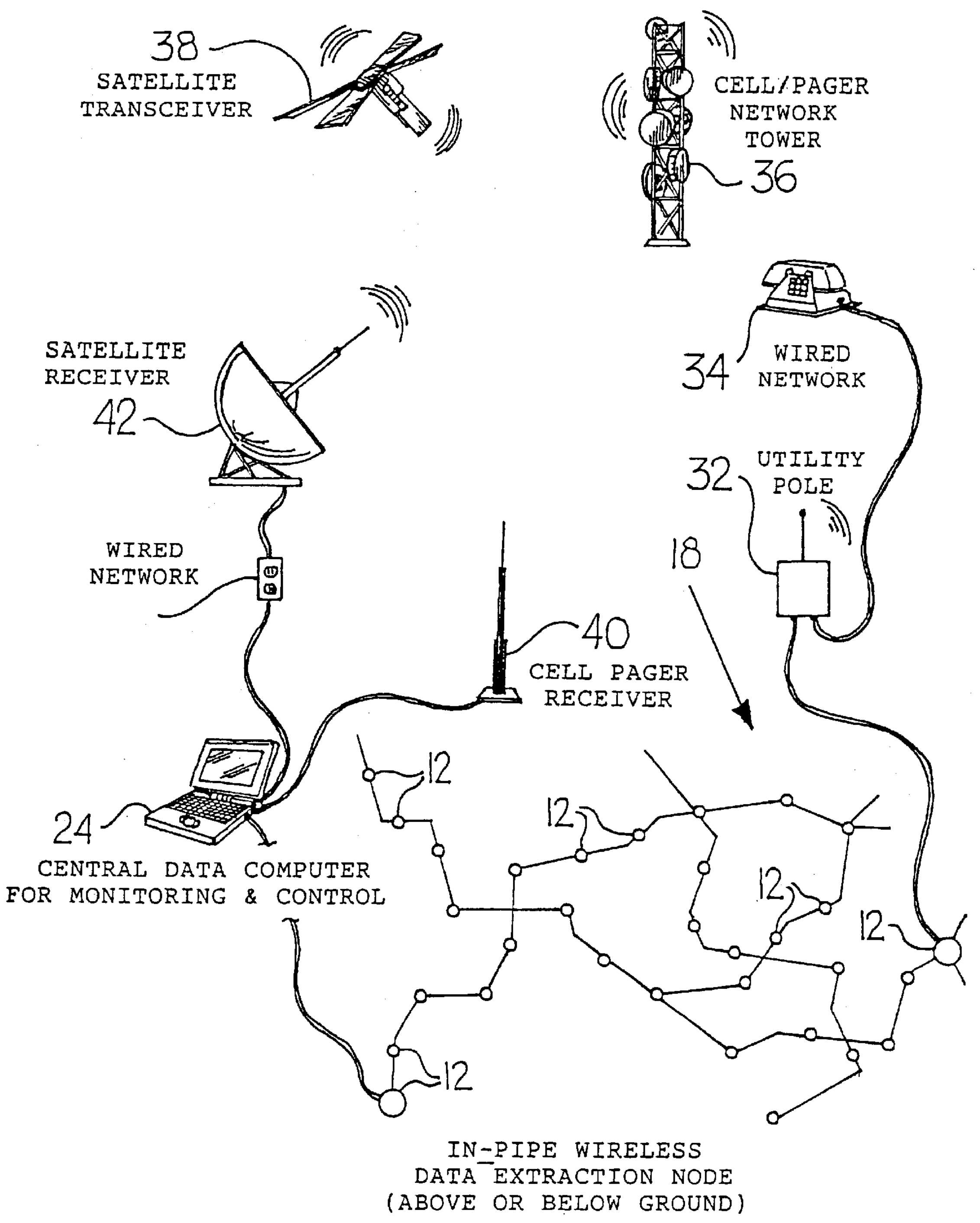
FIG. 2 is a schematic view of a further embodiment of a conduit network system according to the present invention.

The communication aspect of the conduit network system 10 of the present invention has many and various modes, as illustrated in FIG. 2. A node element 12 in the conduit network 18 can transmit the data signals 22 in various forms other than the in situ conduit 16 area. For example, a utility pole 32 with pre-existing hard-wired lines, whether or not connected to a wired network 34, can be used to transmit the data signals 22 to the system control mechanism 24. Such a wired network 34 could use the telecommunications lines and modems for transmitting the information. Additionally, a cell/pager network tower 36 can be used to transmit the information in a wireless form, and yet another embodiment could use a satellite transceiver 38 to transmit this information. The data signals 22 received and processed by the node element 12 can be communicated to the system control mechanism 24, another node element 12, the data extraction device 28, the memory storage medium 30, etc. in a variety of formats.

When the system control mechanism 24 is in a remote location, it may be beneficial to use a wireless format. In any case, in order to receive the communications in a proper format, the system control mechanism 24 can be in communication with a cell-pager receiver 40, a satellite receiver 42 or other hard-wired network connection. In this manner, the conduit network system 10 has many communication options, regardless of where the node element 12 is located.

In one embodiment, the system control mechanism 24 is remotely located and in the form of a computing device, such as a personal computer. The system control mechanism 24 would be located in a central control station that receives all of the data signals 22 in substantially real-time format and displays this information to the end user in a graphical form for analysis, as described in detail hereinafter. Also, the system control mechanism 24 can be used to issue commands or action signals via the same communications network to the node element 12 or a conduit control component 44. The conduit control component 44 is a system component that interacts with the conduit 16, the material 20 transferred through the conduit 16 or an area around or adjacent the conduit 16. The system control mechanism 24 can transmit command signals and provide instruction. For example, when the conduit control component 44 is a valve or a regulator, the system control mechanism 24 could issue "open" or "close" commands and affect the operations of the conduit network 18.

As discussed, the data signals 22 that are received and processed by the node element 12 may be transmitted through the inner area 14 of the conduit 16. As would be the case in a lower density or gaseous conduit-media situation, when using radio frequency signals, it may be preferable to construct the conduit 16 from a material that is reflective or conductive with respect to the data signals 22. In this configuration, the inner space 14 of the conduit 16 acts as a wave guide in a wireless communications medium. An example of such material of construction for use in connection with radio frequency signals would be a metallic or semi-metallic material.

The node element 12 may also include a node control mechanism 46. This node control mechanism 46 receives, processes and communicates data between itself, sub-components of itself, another node element 12, the system control mechanism 24, the sensor system 26, a communications network, the data extraction device 28, the memory storage medium 30, etc. As discussed in detail hereinafter, the node control mechanism 46 can be in the form of one or more printed circuit boards having the logic and circuitry to control and process information directed to the sub-components of the node element 12. In addition, the node control mechanism 46 may include the appropriate communication software or hardware to communicate with the system control mechanism 24 in both a hard-wired and wireless format.

Figure 3:
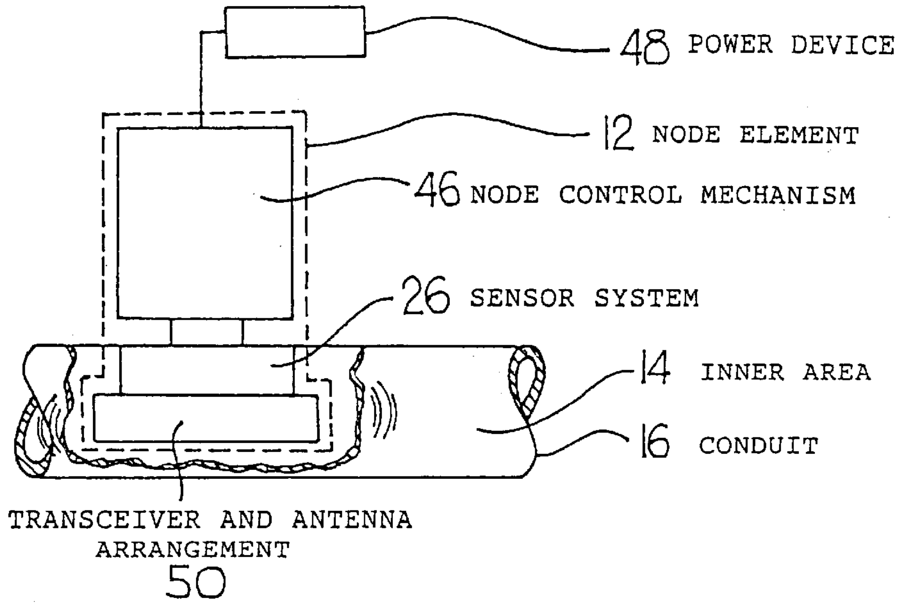
FIG. 3 is a schematic view of one embodiment of an installed node element according to the present invention.

One preferred embodiment of the node element 12 as fitted with the conduit 16 is illustrated in FIG. 3. In this embodiment, the node control mechanism 46 is in communication with or integral with various sub-components, including a power device 48 and a transceiver and antenna arrangement 50. In this embodiment, the transceiver and antenna arrangement 50 is co-located with the sensor system 26 and both the transceiver and antenna arrangement 50 and the sensor system 26 project into the inner area 14 of the conduit 16. Of course, while it is illustrated that these devices project into the inner area 14 of the conduit 16, it is only necessary that they be in communication with the inner area 14 of the conduit 16, such as by a side pipe of or some linkage to the conduit 16.

The power device 48 is used to power the various electronic sub-components of the node element 12, such as the node control mechanism 46, the sensor system 26, the transceiver and antenna arrangement 50, etc. Further, in this embodiment, the node element 12 has two communication aspects, namely COM1 and COM2. COM1 is designated as the primary communications channel and is a wireless communication through the inner area 14 of the conduit 16. COM2 is a hard-wired data-extraction link to either an underground or aboveground hard-wired or wireless communications device.

Figure 4:
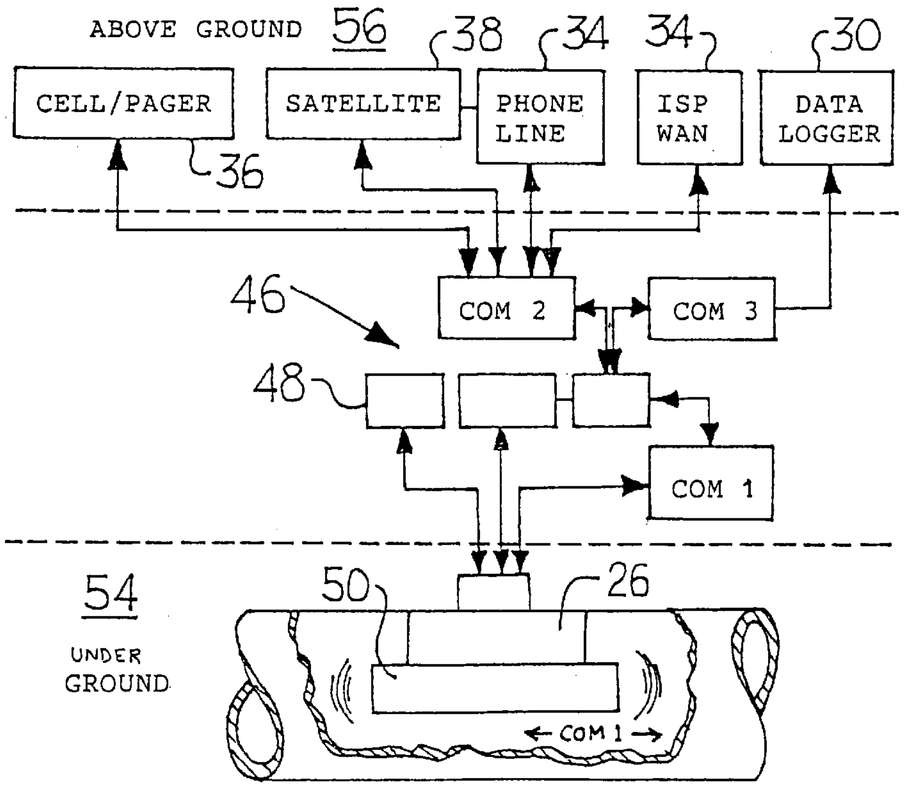
FIG. 4 is a schematic view of another embodiment of an installed node element according to the present invention.

Another arrangement of the node element 12 as it is positioned with respect to the ground surface is illustrated in FIG. 4. In this preferred and non-limiting embodiment, the transceiver and antenna arrangement 50, as well as the sensor system 26, is located underground 54 and in an inner area 14 of the conduit 16. The support electronics, namely the node control mechanism 46, power device 48 and other communications equipment are placed either underground 54 or aboveground 56. For example, these electronic components could be placed in a more accessible underground 54 location and connected via wires and/or conduit, or located aboveground 56 for easier more frequent access. Aboveground 56 access is especially convenient for techniques that utilize aboveground communications, such as cell/pager network towers 36, satellite transceivers 38 and wired networks 34, such as modem or ISP-networks. This is also true for data extraction device 28 or memory storage medium 30 techniques. For example, a data-logging system having a physical memory module, or a wired or wireless dump from a data-logger to a memory module, would also have better access in an aboveground 56 location. In this embodiment, COM1 is the wireless in-pipe conduit 16 communications link, while COM2 is the external wired or wireless communications link and COM 3 is the link to a data extraction device 28 or memory storage medium 30, such as a data-logging memory module.

Figure 5:
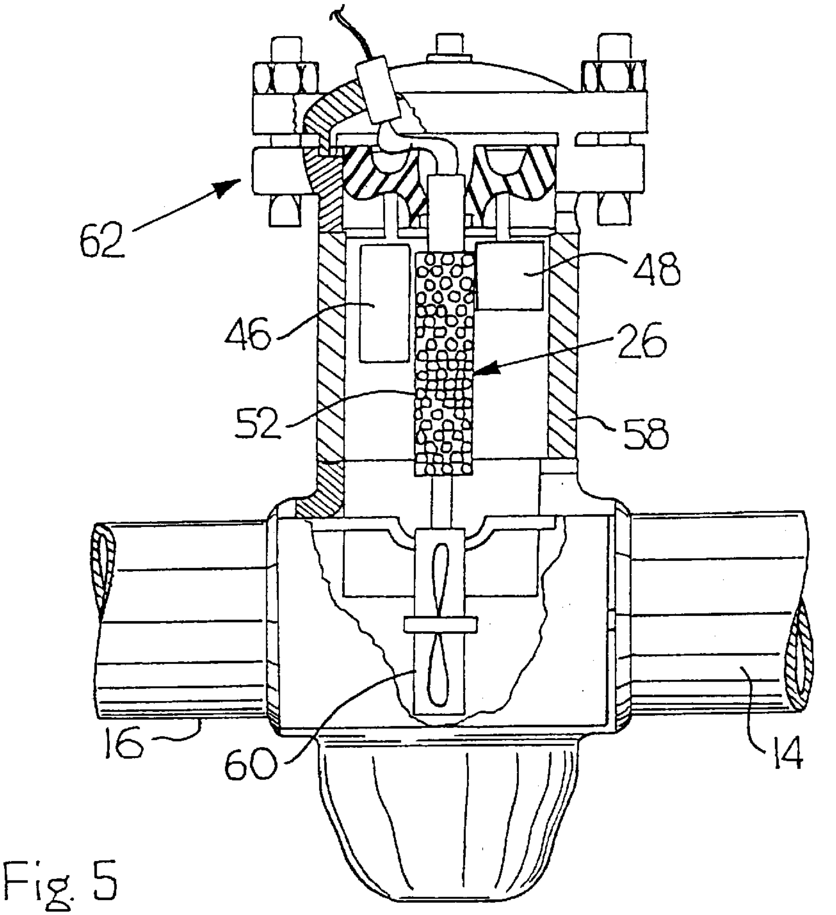
FIG. 5 is a schematic view of a further embodiment of a node element according to the present invention.
Figure 6:
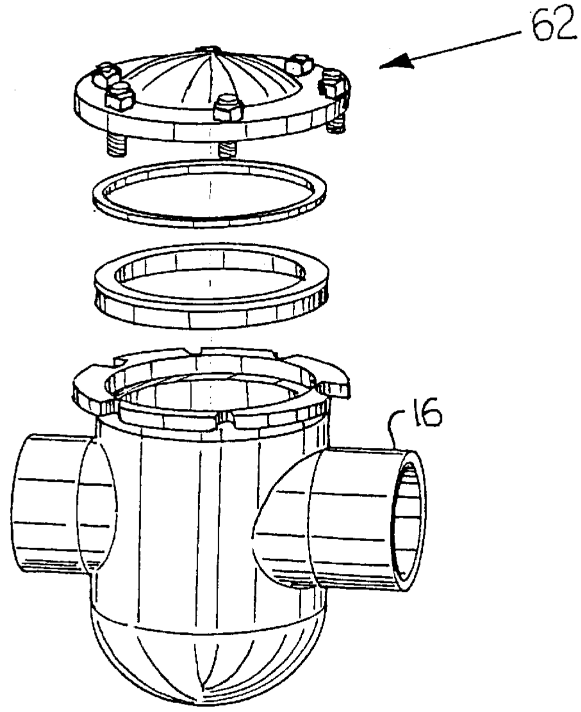
FIG. 6 is a perspective view of the node element of FIG. 5.

In another preferred and non-limiting embodiment, as illustrated in FIGS. 5 and 6, the node element 12 can be a self-contained and self-powered unit. In this embodiment, the sub-components of the node element 12 are located in a protective housing 58. The node control mechanism 46 and other sub-components of the node element 12 that require power are powered by an in-line power-generating device 60, such as a power turbine. This in-line power-generating device 60 is located in the inner area 14 of the conduit 16 and uses the material 20 or physics of the material 20 to drive the device 60 and generate power for the node element 12. In case of device 60 failure or malfunction, this embodiment of the node element 12 also includes a second power device 48 in the form of a back-up battery.

The power device 48 can be located in a variety of positions and have a variety of operating characteristics. For example, the power device 48 can be located in some enclosure positioned in an aboveground 56 location, which is accessible by a user. In addition, the power device 48 can be located in an aboveground 56 location and in communication with a fixed power source via a hard-wired connection. Further, the power device 48 can be in an underground 54 location or even in the inner area 14 of the conduit 16. When located in the inner area 14 of the conduit 16, the power device 48 can use the physics of the material 20 transferred through the conduit 16 to generate power, as discussed above.

Figure 7A:
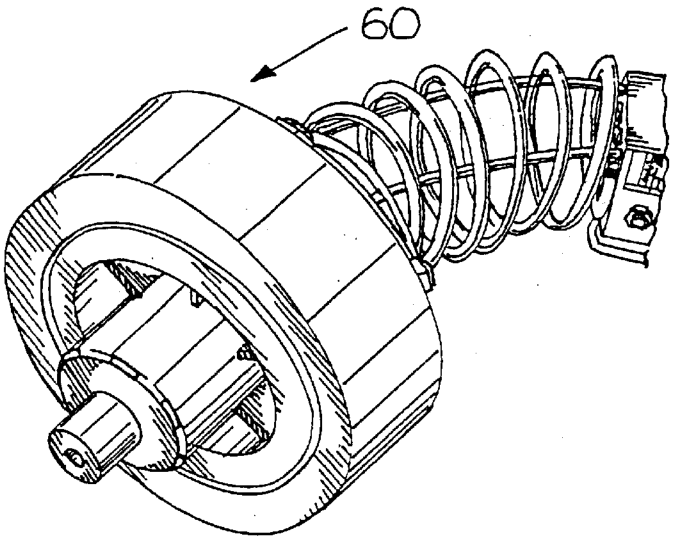
FIGS. 7(*a*)–(*c*) are perspective views of in-line power generating devices according to the present invention.
Figure 7B:
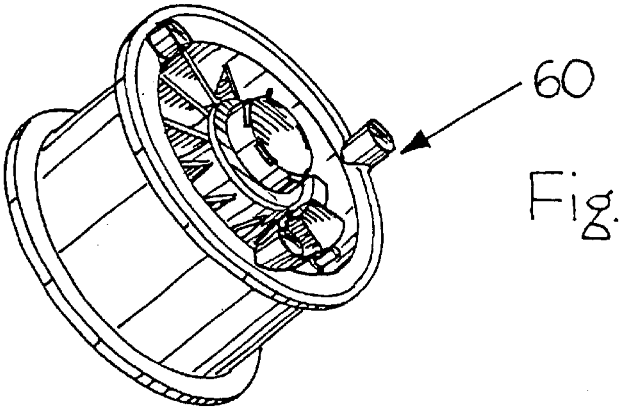
Figure 7C:
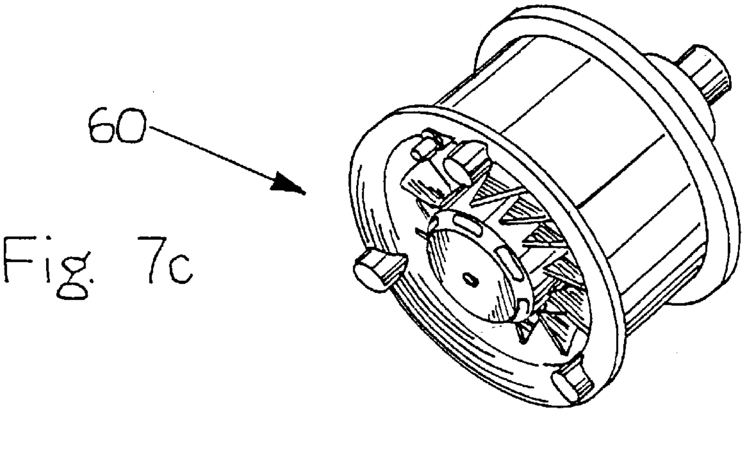

Further, in order to provide access to the sub-components of the node element 12, a connector/cap arrangement 62 is used as a cover to the protective housing 58 and provides a user or maintenance person the ability to access the node element 12 for repair purposes. An exploded perspective view of the connector/cap arrangement 62 is illustrated in FIG. 6. Further, various in-line power-generating devices 60 are illustrated in FIGS. 7(*a*)–(*c*). While each of the illustrated devices 60 are in-line turbine power generators, any self-reliant in-line power-generating device 60 is envisioned.

Figure 8:
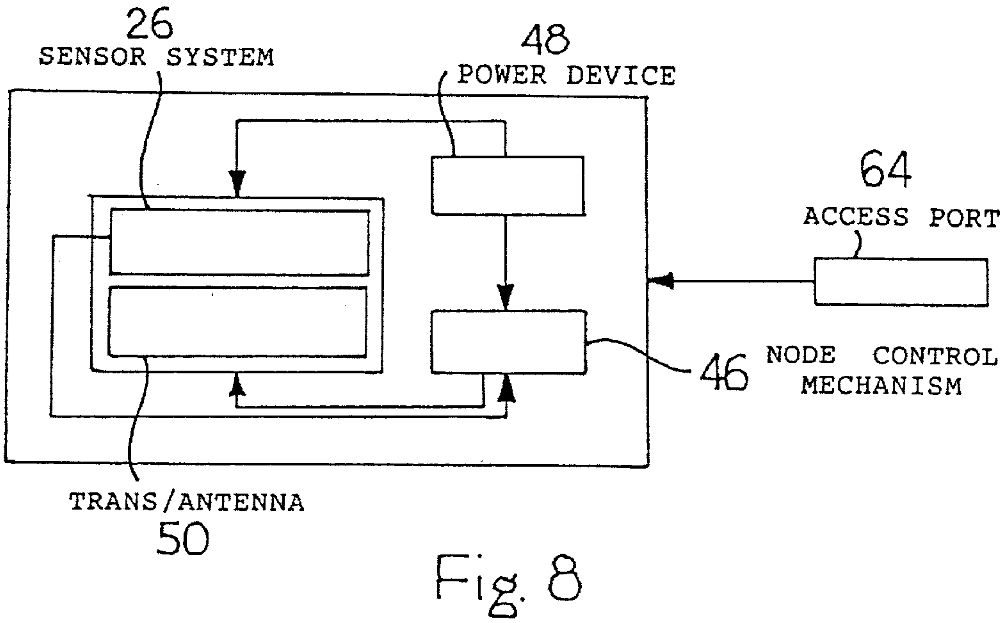
FIG. 8 is a schematic view of a further embodiment of a node element according to the present invention.
Figure 9:
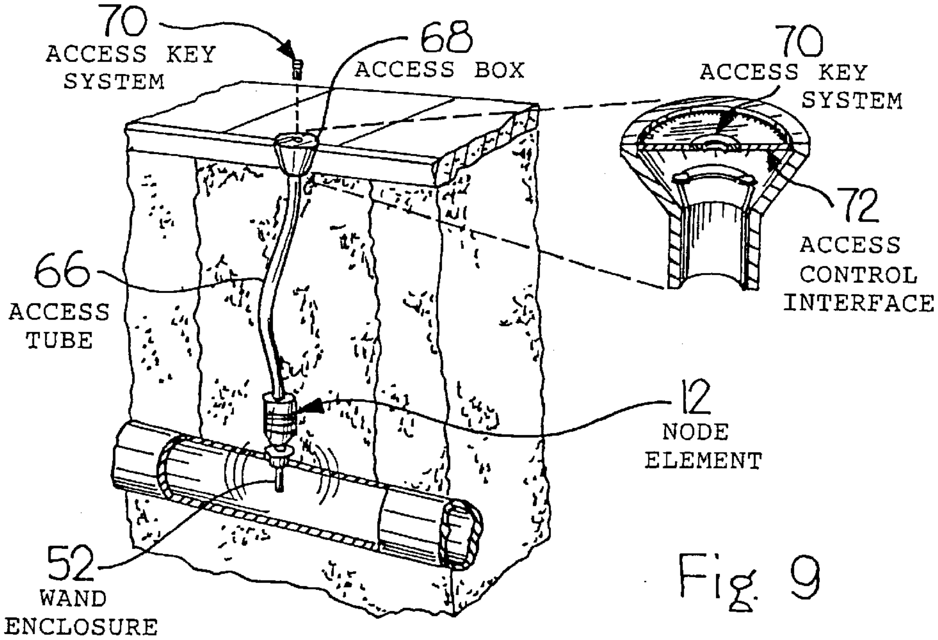
FIG. 9 is a perspective view of the installed node element of FIG. 8.
Figure 10:
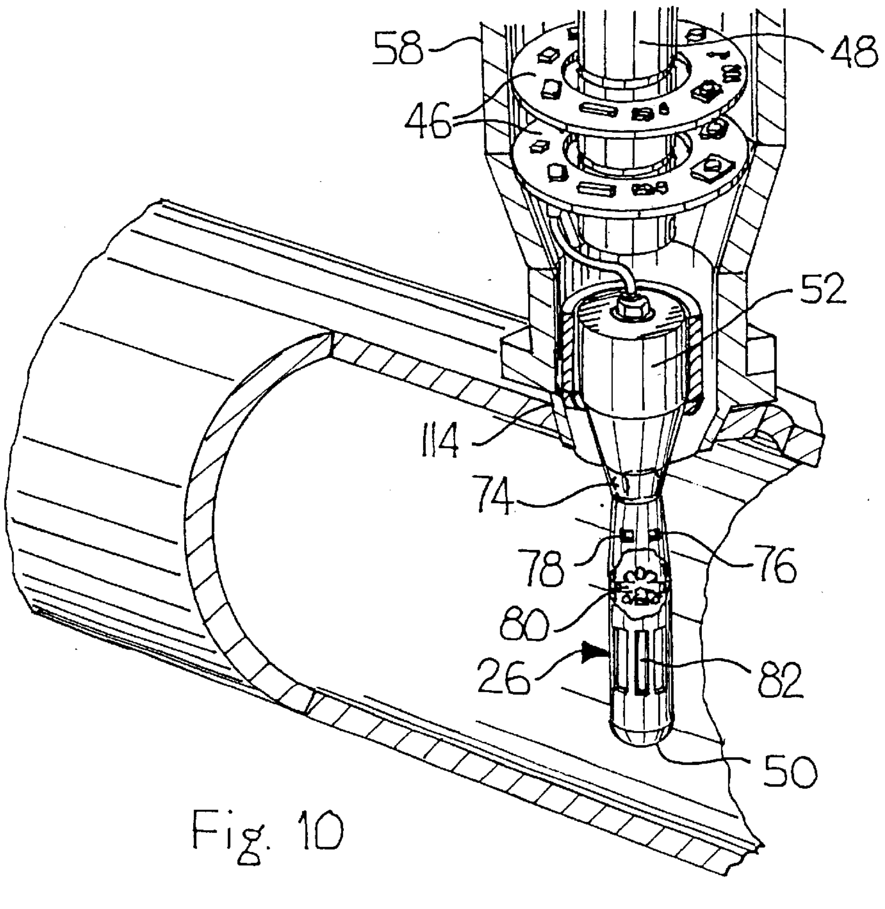
FIG. 10 is an expanded perspective view of the node element of FIG. 9 with a protective housing removed.

Another node element 12 configuration is illustrated in FIG. 8. In this embodiment, both the sensor system 26 and the transceiver and antenna arrangement 50 are located in the inner area 14 of the conduit 16. A power device 48 powers both of these systems, as well as the node control mechanism 46. In order to access the sub-components, an access port 64 is provided to allow a user to reach these underground 54 components. This configuration is also illustrated in FIGS. 9 and 10. As seen in FIG. 9, the access port 64 includes an access tube 66 through which wiring or other cable or line is extended, an access box 68 placed at a level that is accessible from an aboveground 56 position, and an access key system 70 for allowing a user to lock and unlock the access box 68. The access tube 66 is connected to the protective housing 58, and the sensor system 26 and transceiver and antenna arrangement 50 extend into the inner area 14 of the conduit 16. As seen in FIG. 10, the power device 48 and the node control mechanism 46, in the form of printed circuit boards, are located in the protective housing 58, and the sensor system 26 and the transceiver and antenna arrangement 50 are located in a wand enclosure 52. As discussed above, the wand enclosure 52 is removable and has a flex joint 74, which allows for safe impact by objects passing through the inner area 14 of the conduit 16. Further, in this embodiment, the sensor system 26 includes a gas sensor 76, a pressure sensor 78, a flow sensor 80 and an anemometer 82. All of these sensor system 26 components are located in the wand enclosure 52 with appropriate interface with the conduit 16 and/or the material 20 flowing through the conduit 16.

Figure 11:
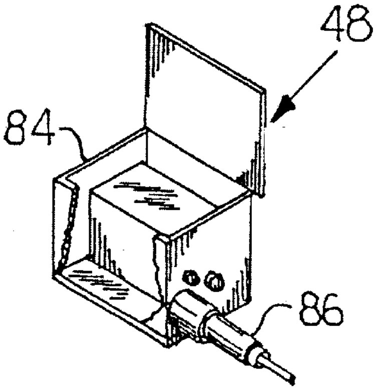
FIG. 11 is a perspective view of a power device according to the present invention.

One preferred and non-limiting embodiment of a power device 48 is illustrated in FIG. 11. In this embodiment, the power device 48 is a battery and is housed in a power device enclosure 84. A power cable 86 is connected to the battery and provides power to the sub-components of the node element 12. By placing the power device 48 in the power device enclosure 84, the power device 48 can then be buried in an underground 54 location.

Figure 12:
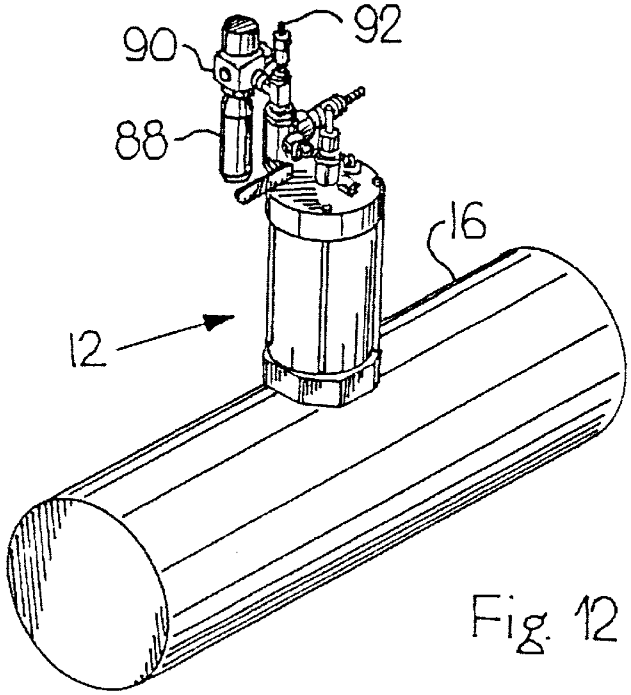
FIG. 12 is a perspective view of a further embodiment of an installed node element according to the present invention.
Figure 13:
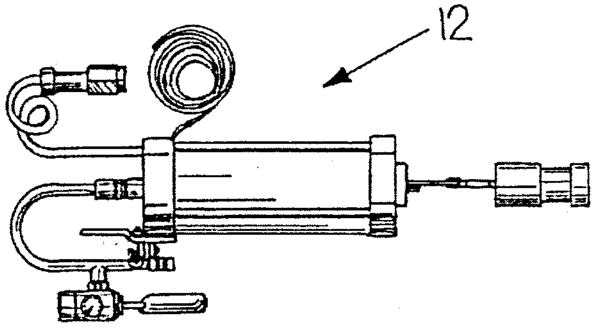
FIG. 13 is a perspective view of the node element of FIG. 12 in the form of a kit according to the present invention.

In order to improve the safety of the conduit network system 10, the node element 12, or at least the sub-components of the node element 12 that have power consumption or the possibility of sparking, may be enclosed in the protective housing 58. However, as seen in FIG. 12, this protective housing 58 can be sealed and evacuated by, for example, a vacuum pump (not shown) and, thereafter, blanketed with an inert gaseous material at a pressure at least equal to, and preferably slightly above, the internal conduit 16 pressure (thereby replacing the oxygen which acts as the essential oxidizer in any explosive combustible reaction). In the embodiment illustrated in FIG. 12, a liquid $CO_2$ cylinder 88 allows gas to flow through a regulator 90, further through a safety valve 92 and into the inner area of the protective housing 58, which holds, for example, the power device 48, the node control mechanism 46, etc. This evacuated node element 12 configuration increases the inherent safety of the node element 12 as well as the safety in the conduit network 18, particularly if the material 20 is natural gas. A kit of the node element 12 illustrated in FIG. 12 is shown in FIG. 13, inclusive of the evacuation equipment and the wand enclosure 52.

Figure 16:
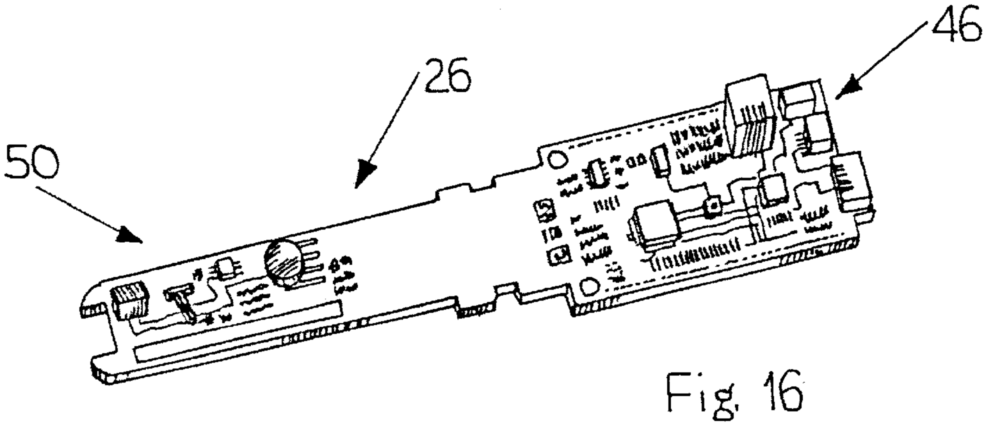
FIG. 16 is a perspective view of the sub-components of FIG. 14.
Figure 14:
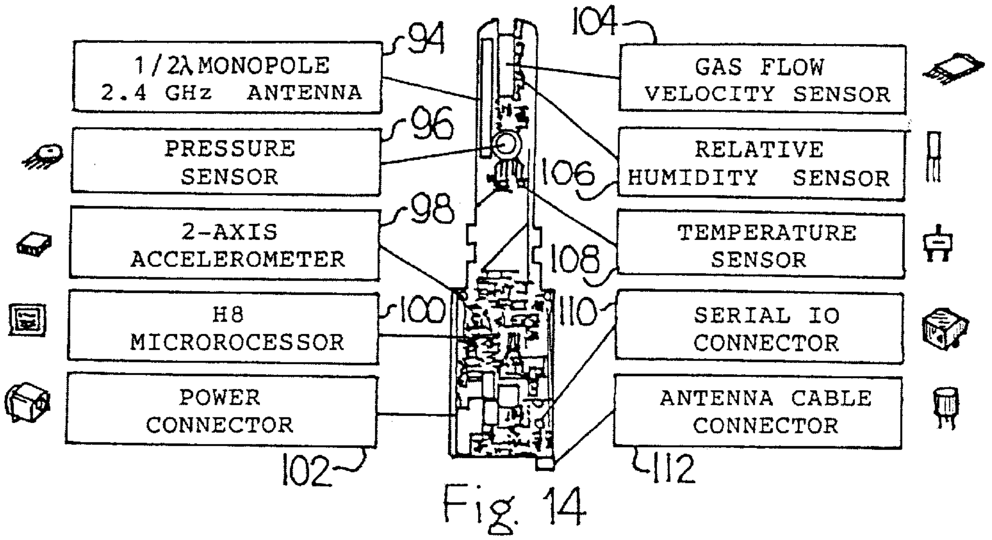
FIG. 14 is a front view of a sensor system, transceiver and antenna arrangement and node control mechanism according to the present invention.
Figure 15:
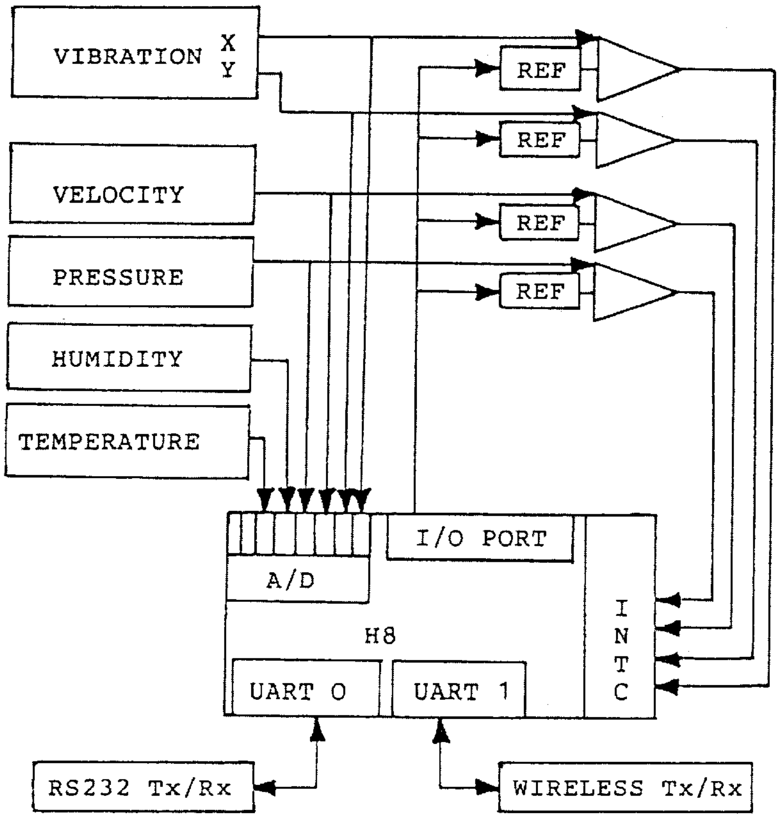
FIG. 15 is a perspective view of the electronics architecture of FIG. 14.

A preferred embodiment of the sensor system 26 that is positioned in the wand enclosure 52 is illustrated in FIG. 14 in the form of a single printed circuit board, which was potted in a machined fitting. This sensor system 26 includes a ½λ wave-length Monopole 2.4 GHz antenna 94 (which is customized to a specific pipe size and installation), a pressure sensor 96, a 2-axis accelerometer 98, a microprocessor 100, a power connector 102, a gas flow velocity sensor 104, a relative humidity sensor 106, a temperature sensor 108, a serial input/output connector 110 and an antenna cable connector 112. All of these components are placed on the single printed circuit board in proper locations. In order to accommodate several conduit 16 diameters, and to ensure that the gas flow velocity sensor 104 would reside at the centerline of the conduit 16, the printed circuit board may be designed with break-off notches so as to allow for proper alignment during potting operations into a stainless NPT-plug. The electrical system flow diagram of this sensor system 26 arrangement of FIG. 14 is illustrated in FIG. 15. The electronics are based on an architecture that relies on a dedicated microprocessor 100 to poll all the sensors on the printed circuit board, while interfacing with the wireless radio frequency-electronic communications is established through a simple serial cable with a pre-established protocol. A fully populated and assembled printed circuit board including the sensor system 26 is shown in FIG. 16.

Figure 17:
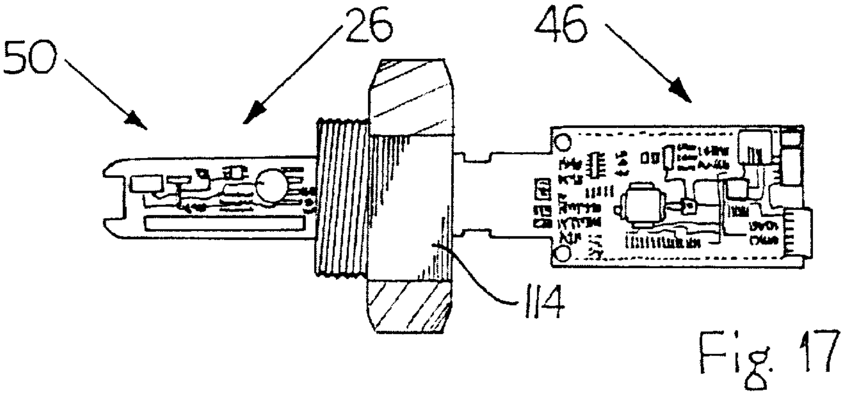
FIG. 17 is a perspective view of the sub-components of FIG. 14 with an attachment mechanism for use in a conduit.
Figure 20:
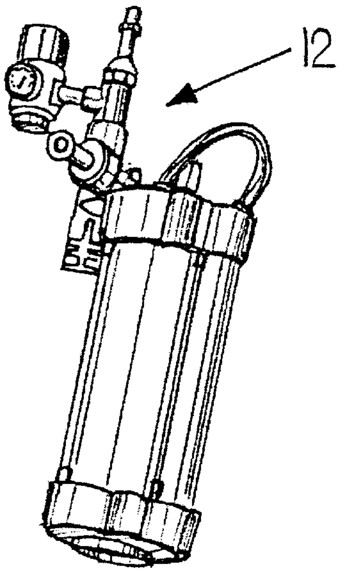
FIG. 20 is a perspective view of a protective housing surrounding a node element according to the present invention.

The sensor system 16 shown in FIG. 17 includes an NPT fitting 114, which is used to connect the wand enclosure 52 at least partially in the inner area 14 of the conduit 16. It is envisioned that the microprocessor 100 and other control components of the sensor system 26 could be integrated with, or in communication with, the node control mechanism 46, since the node control mechanism 46 provides for the overall control and communication of the various sub-components of the node element 12. As discussed previously, the protective housing 58 can be used in conjunction with the NPT fitting 114 and provides protection for both the printed circuit board as well as providing additional operational safety in the node element 12 and inner area 14 of the conduit 16. Also, as discussed, a vacuum pump could evacuate a sealed area within the protective housing 58, which is a welded-on fitting that is internally exposed to the media inside the conduit 16, down to 1/10 of an atmosphere, after which the liquid $CO_2$ cylinder 88 would deliver inert gas into the area through the regulator 90 set to several psig above the conduit 16 internal pressure. Such a state could be preserved and monitored while the unit is powered from a power device 48, such as a remote battery unit. Another perspective view of this configuration, as assembled, is illustrated in FIG. 20.

As safety is of primary concern when dealing with various conduit networks 18, the node element 12 configuration can be constructed in various ways in order to meet regulatory standards. Three such configurations are illustrated in FIGS. 18(*a*)–(*c*). In FIG. 18(*a*), an intrinsically safe configuration is illustrated. This approach is used for installation where limited energy is provided to the setup directly attached to the conduit 16, typically around one Watt. An additional electronic safety barrier 116 can limit the potential of excessive energy (current during a short-circuit, for instance) entering the hazardous media. While this approach is not difficult, it does require careful design and may not be viable for larger power devices 48.

Another safety configuration is shown in FIG. 18(*b*), which is an explosion-proof safety design. This approach encloses all the pertinent electronics inside the protective housing 58, which is a large and thick enclosure, and in this case is not filled with an inert gas. When there is an internal ignition in this thick housing 58, external hazardous media would not ignite. This will allow for the use of standard electronic devices in constructing the node element 12, at the penalty of size, weight and cost.

Finally, as shown in FIG. 18(*c*), and as discussed in detail previously, electronic components can be mounted in an enclosure, such as the protective housing 58, which is then evacuated to remove all oxygen-containing gases formed in the housing 58 where spark or thermal ignition may occur. The inner area is then blanketed with an at-pressure inert gas, which is then pressurized slightly above ambient and monitored via hardware or software to guarantee operation under safe conditions. It is also envisioned that a non-conductive liquid, such as a mineral oil, can be used to replace all oxygen with a full-immersion liquid fluid-standard technique in the underwater industry for pressure-equilibrating enclosures with internal electronics. This approach will allow for smaller, lighter and less costly safety installations as compared to explosion-proofing.

Figure 19:
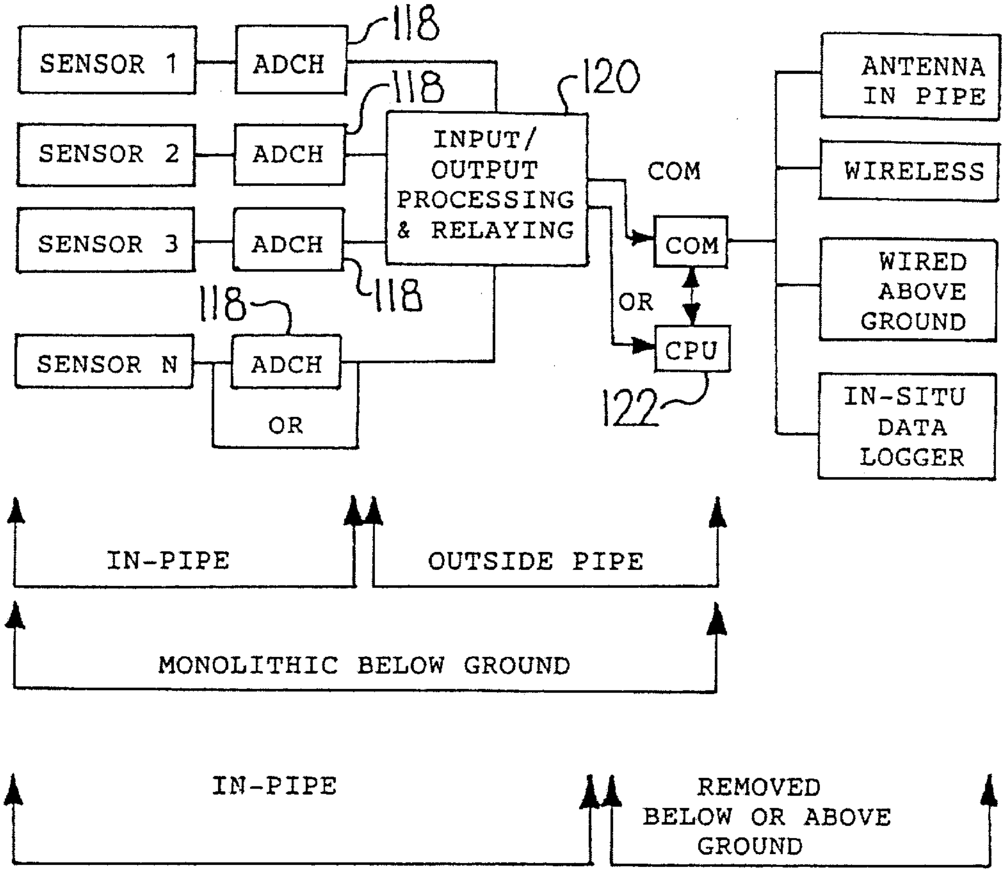
FIG. 19 is a schematic view of a node element using analog/digital converter hardware.

As seen in FIG. 19, the individual sub-components of the sensor system 26 could be in communication with one or more analog/digital converter hardware components 118, which, in turn, could be in communication with an input/output processing and relaying device 120. Both the analog/digital converter hardware components 118 and the input/output processing and relaying device 120 could be combined with a central processing unit 122, all in the form of one node control mechanism 46. Further, all communications could be processed via communication with the central processing unit 122 or the input/output processing and relaying device 120. The communications could occur through the transceiver and antenna arrangement 50, the data extraction device 28, the memory storage medium 30, the wired network 34, the cell/pager network tower 36, the satellite transceiver 38, or other hard-wired or wireless communication media.

Figure 21:
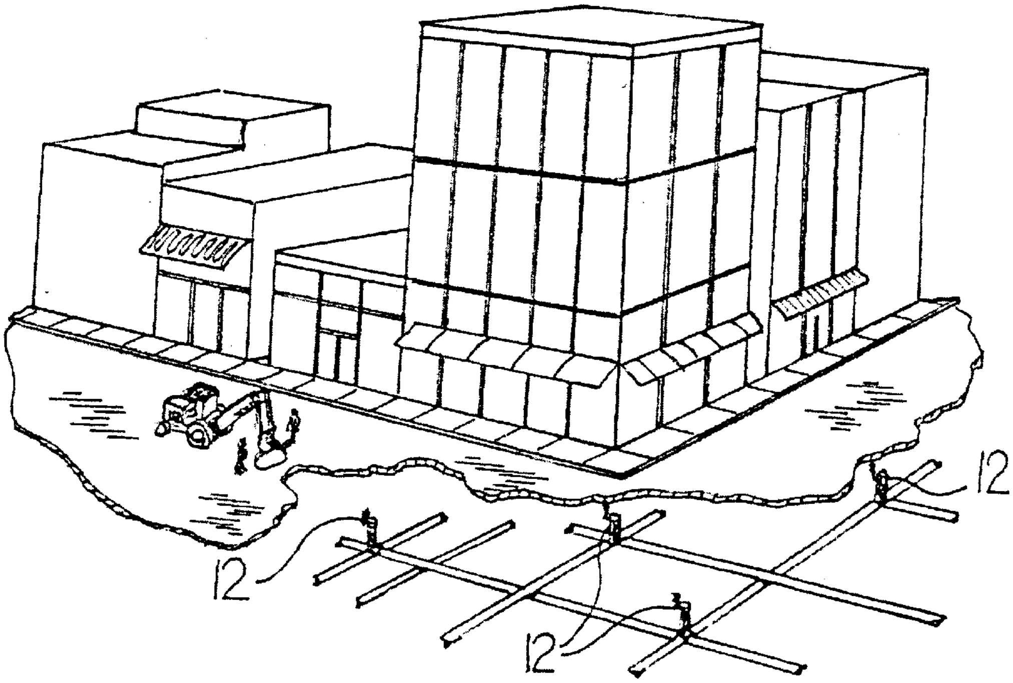
FIG. 21 is an illustration of an installation process for installing multiple node elements according to the present invention.
Figure 22:
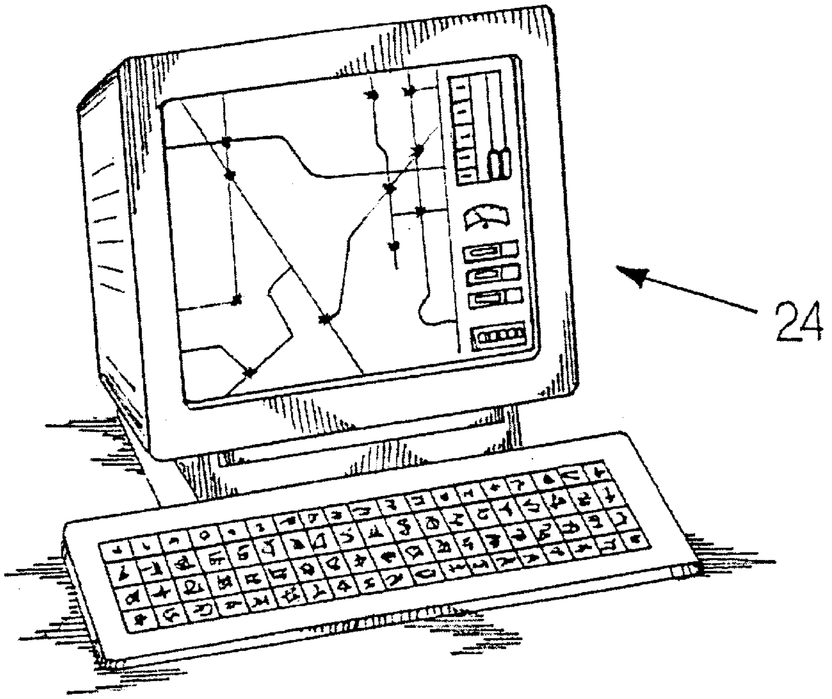
FIG. 22 is an illustration of a possible screen display of the system control mechanism according to the present invention.

In installation of the node elements 12, as illustrated in FIG. 21 for underground environments, an excavation crew could hook up each node element 12 at various locations in the conduit network 18. All of these various node elements 12 would be in communication with the system control mechanism 24, which, as shown in FIG. 22, could be a personal computing device, which may display an urban network map, faulty line detection information, sensed information, data signals 22, or other data in the form of a visual or graphical display.

The node control mechanism 46 may include various sub-components or printed circuit board relays and connections that add a number of functional aspects. Not only can the node control mechanism 46 have various hardware sub-components, the node control mechanism 46 can also perform various functions using this hardware in a combined and integrated format. For example, the node control mechanism 46 can include a data acquisition module for receiving the data signals 22 from the node element 12, sub-components of the node element 12, another node element 12, the system control mechanism 24, the sensor system 26, a communications network, a memory storage medium 30, etc. The node control mechanism 46 may also include a communications module for handling the communications traffic between the node element 12, the sub-components of the node element 12, another node element 12, the system control mechanism 24, the sensor system 26, a communications network, the memory storage medium 30, the data extraction device 28, etc. Still further, the node control mechanism 46 may include an administration module for monitoring and transmitting data representative of the node control mechanism 46 status. Such status information could be transmitted to an end user so that data integrity can be preserved and maintenance schedules observed and tracked. In addition, other code modules could be used to supply add-on functionality to the node control mechanism 46. For example, such functionality could include triggering and controlling ancillary actuation systems in the form of conduit control components 44, and also safety sensor monitoring which may be permanently installed or monitored by road crews. While such control typically is conducted locally by the node control mechanism 46 at the node element 12, control operations could also be managed and processed by the system control mechanism 24 in a central location.

In one preferred and non-limiting embodiment, the node control mechanism 46 includes software that resides on the microprocessor 100, which runs custom firmware to interface to pressure, velocity, relative humidity, temperature, accelerometer, 2-serial communication devices and digital potentiometers. The digital potentiometers are set up to provide voltage thresholds for providing "alarms." One serial port (local) is connected to an RS-232 transceiver, while the second port (wireless) is connected to a wireless transceiver unit running its own proprietary software. On-board configuration switches define each unit's identification number and master-slave designation. Firmware programmed into the microprocessor 100 is dependent upon the master-slave designation of the node element 12. Master node elements 12 can be set up to copy messages from the local serial port to a wireless format and vice versa, thereby allowing a data logging hook-up while also serving as a relay node element 12. In this manner, the master node element 12 relays all messages between a user interface and the rest of the node elements 12 in the conduit network system 10. The microprocessor 100 firmware could implements three or more different work modes: one special work mode state and two configuration modes. Different work modes are defined to allow different levels of power, conservation and interactivity of the conduit network system 10. Configuration modes allow for the user to configure and run diagnostics on the node element 12.

The node control mechanism 46, and in the preferred embodiment, a microprocessor 100, has the following Modes. An interactive mode allows the node control mechanism 46 to continuously receive, process and transmit the data signals 22. Therefore, the node control mechanism 46 or microprocessor 100 continuously run without entering a hardware power-saving sleep state. This mode is particularly useful for the continuous monitoring and reporting of conduit 16 conditions. In a monitor mode, the node control mechanism 46 is used for the periodic checking of conduit 16 conditions. In this mode, after reporting the data or transmitting the data signals 22, the node element 12 goes into a sleep state for a user-defined period of time. A standby mode uses user-defined upper and lower bounds for each node element 12, and in particular the sensor system 26. In this mode, the node element 12 will behave like it does in the monitor mode, except that the data is only reported if any of the sub-components of the sensor system 26 read data that is out of the user-defined limits. The node element 12 can also enter an emergency state while in any of these work modes. If one or more alarms are triggered, the emergency state would wake up and prevent the node element 12 from going into any sleep mode until the user deals with the alarm conditions. When the alarm disappears, the node element 12 returns to the previous work mode.

There are also configuration modes for the node element 12 and node control mechanism 46. In a transparent mode, the user is allowed to configure the communication and other settings using a local serial port for a period once the user exits this mode, the node element 12 returns to the previous work mode. Finally, in a self-test mode, the node control mechanism 46 performs a diagnostic on the sub-components of the sensor system 26 and dumps the results to a local serial port. Once the diagnostic is finished, the node element 12 returns to the previous work mode.

These work and configuration modes, together with the overall above-discussed functionality of the node control mechanism 46, provide each node element 12 with appropriate intelligence and configurability. In the data acquisition function, the input from the sub-components or sensor devices of the sensor system 26 can be input or filtered and the data signals 22 processed or stored on an interim basis. In the communications function, the node control mechanism 46 can engage in data forwarding in a wireless data receive function or a data receive decode and retransmit function. The communications mode, whether hard-wired or wireless, also allows for data transmission, for example, data signal 22 packaging and parsing or data package transmit. Some of the housekeeping items that can be engaged in by the node control mechanism 46 in the housekeeping function are power management, access port monitoring, hard-wired and wireless communications quality monitoring, network status checking and a dynamic routing table updating.

Figure 24:
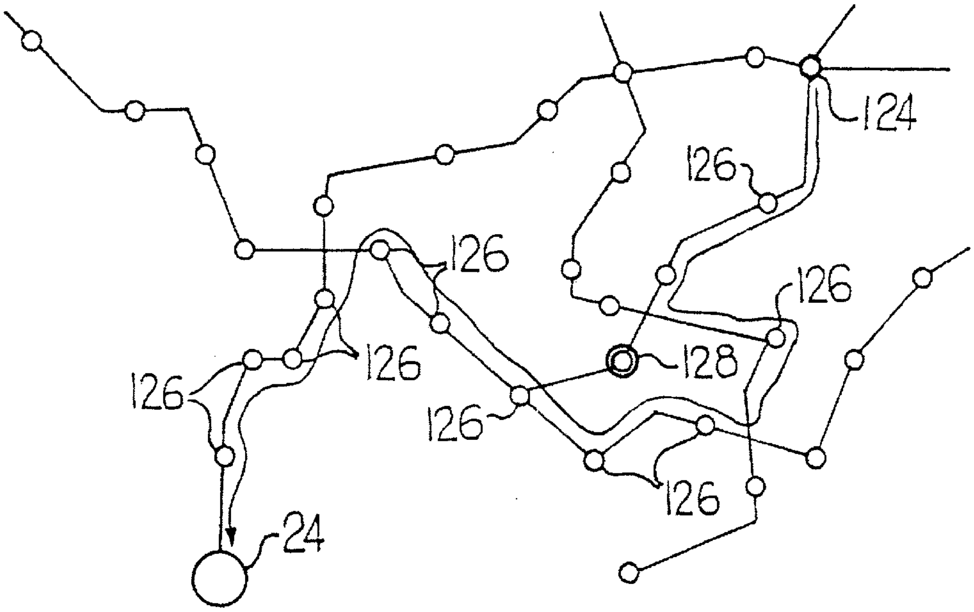
FIG. 24 is a schematic view of a conduit network system communications route.
Figure 23:
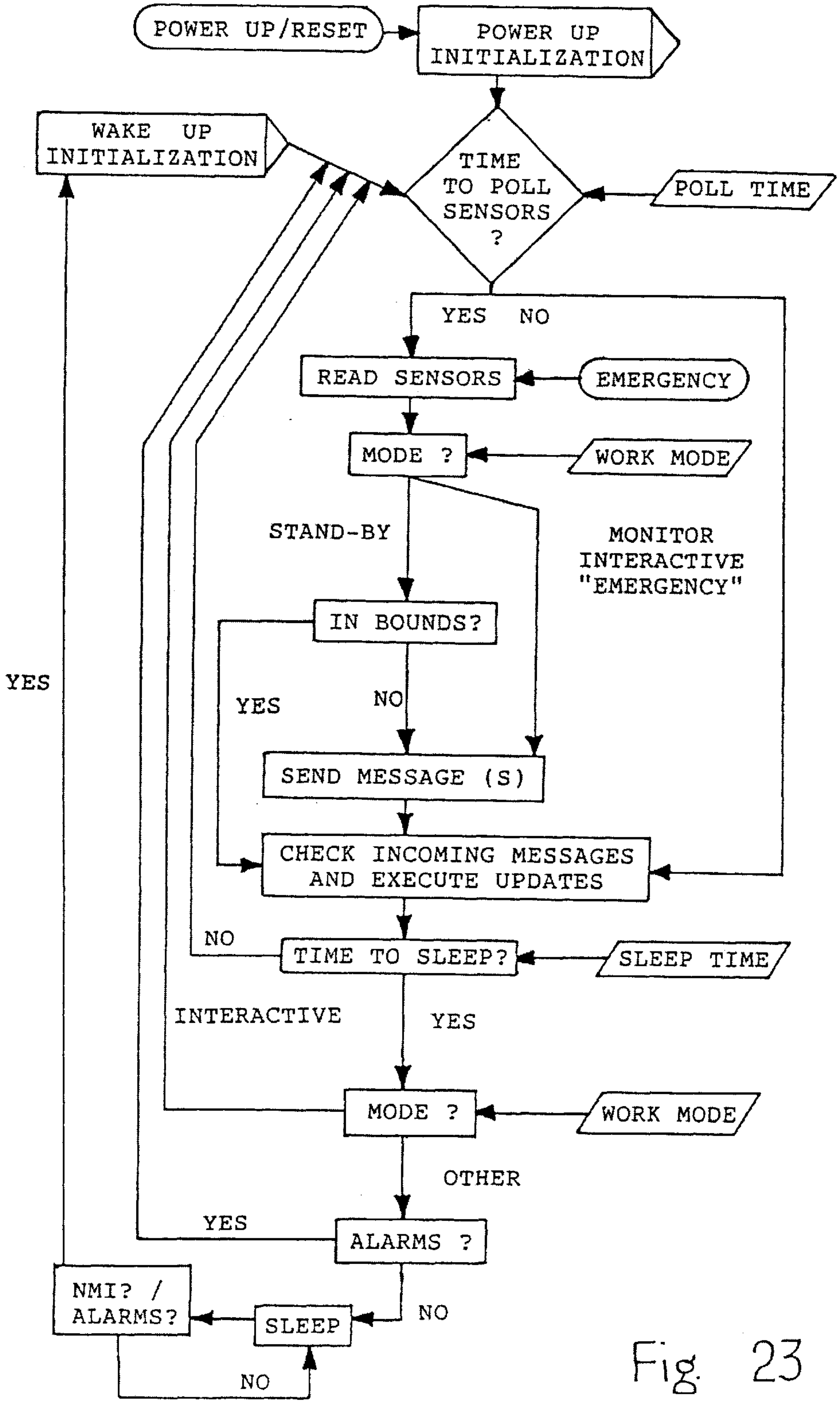
FIG. 23 is a flow diagram of the operation of the system control mechanism in one preferred embodiment according to the present invention.

The operation of the node control mechanism 46 and with respect to the software implementation on the microprocessor 100, is illustrated in FIG. 23. This flow diagram illustrates the various functions and mode settings of the node control mechanism 46. It is this overall functionality that allows each individual node element 12 to act with intelligence with respect to each other. Since the node control mechanism 46 can receive, process and communicate data between its own sub-components, a subsequent node element 12, the system control mechanism 24, the sensor system 26, a communications network, etc., a node control mechanism 46 on a first node element 12 is capable of identifying and making decisions regarding subsequent or other node elements 12. This provides an optimization functionality with respect to the communication between the node elements 12 and the system control mechanism 24. For example, as seen in FIG. 24, when a particular node element 12 is attempting to communicate information to the system control mechanism 24, it is labeled the data sender node element 124. The other node elements 12 that relay these data signals 22 are labeled relay node elements 126. The relay node elements 126 continue to pass the data signals 22 along until they reach the system control mechanism 24. However, if a "bad" or malfunctioning node element 128 is encountered, the logic and intelligence of the node control mechanism 46 of the immediately prior relay node element 126 allows this relay node element 126 to obviate the bad node element 128 and find a better route to the system control mechanism 24. Further, the logic of the node control mechanism 46 allows the relayed node elements 126 to find the most efficient and optimal path to the system control mechanism 24.

Figure 25:
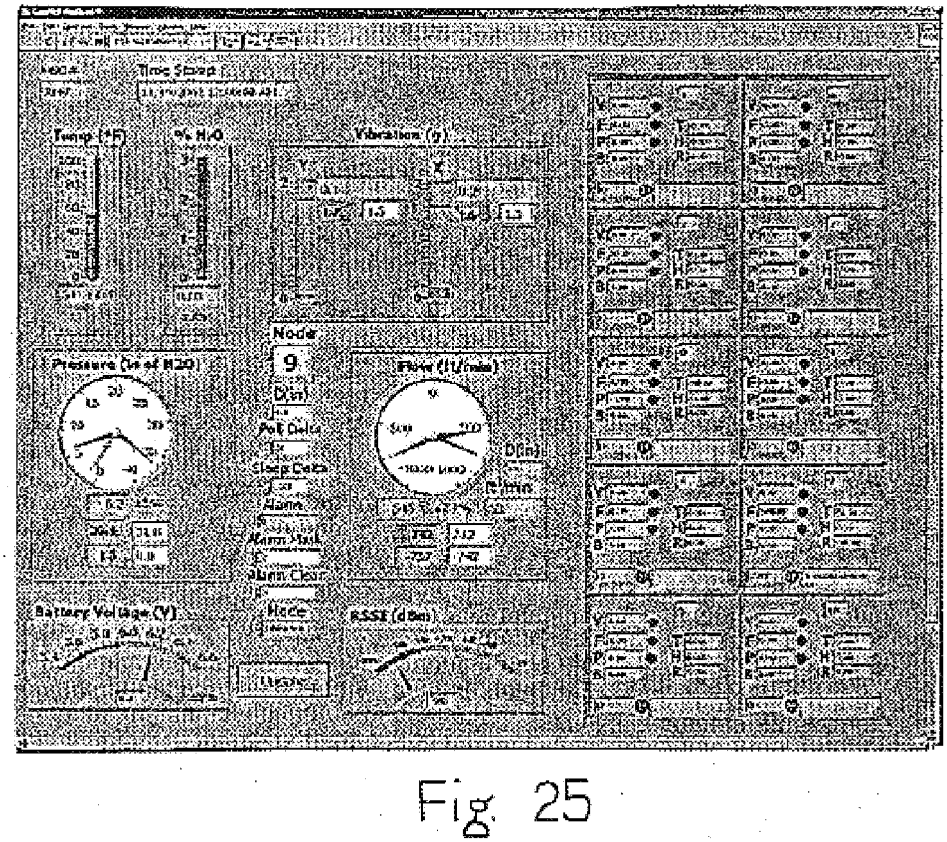
FIG. 25 is a further screen display and interface for use by the system control mechanism according to the present invention.

The system control mechanism 24 includes a user interface that allows a user to visually read and analyze the information and data signals 22 transmitted by the node elements 12. One example of such a graphical user interface is illustrated in FIG. 25. In one embodiment, a single node element 12 data signals 22 can be displayed in a large graphical form, while the data for the other node elements 12 are readily available and able to be switched to in an easy manner. Further, it is envisioned that the interface could receive and display data signals 22 directed to an alarm condition, an out-of-limit condition, command options for the node elements 12 and/or the conduit control component 44 or engage in any other display, formatting or control options.

Figure 26:
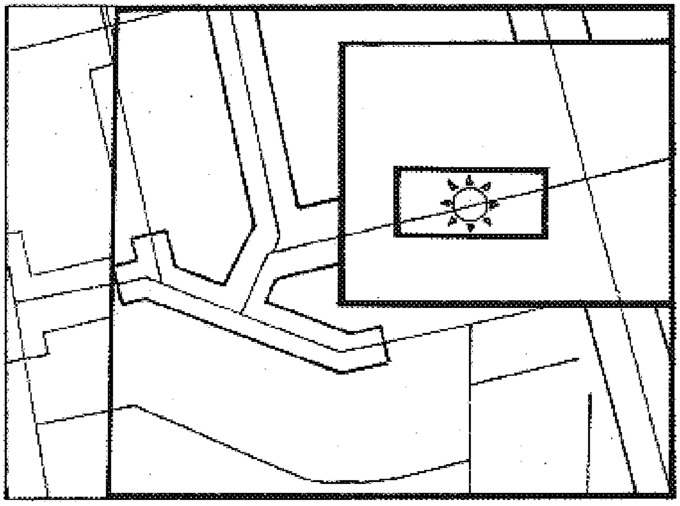
FIG. 26 is a schematic view of a wireless communication range of one embodiment of a node element according to the present invention.

Dependent upon the type of communication used by the node elements 12, each node element 12 can have a varying range of signal communication and data signal 22 transmission. For example, as seen in FIG. 26, a wireless ISM-band radio frequency coverage for an OEM LAN-card with a patch antenna at variable data rate over 1.4 Msq. ft area may cover 2,200 linear feet of high pressure conduit 16.

Figure 27:
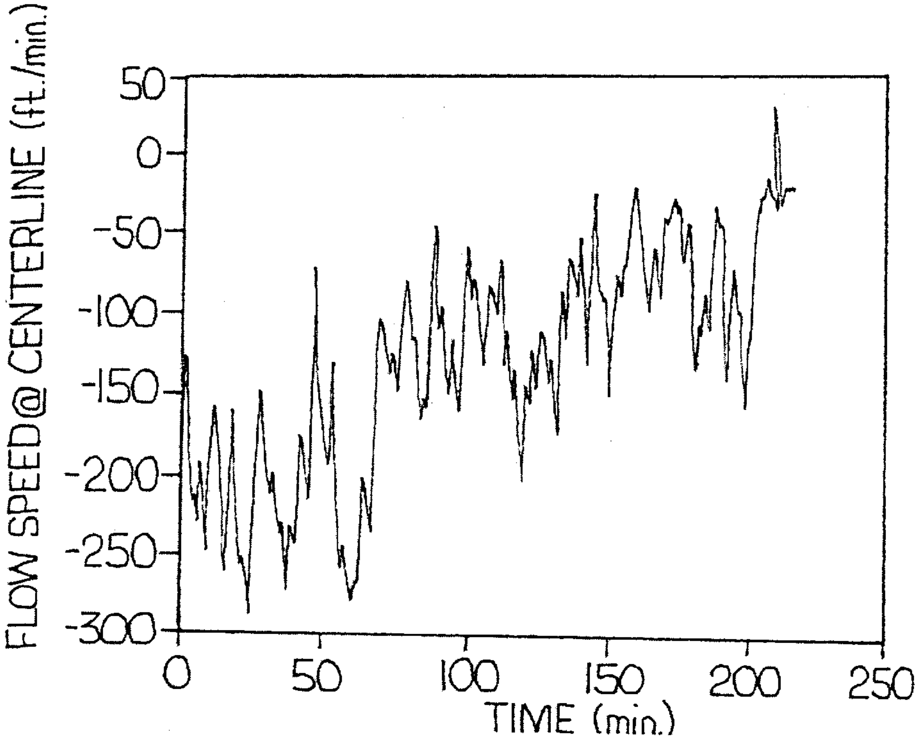
FIG. 27 is a chart illustrating material flow versus time as determined by the system control mechanism according to the present invention.
Figure 28:
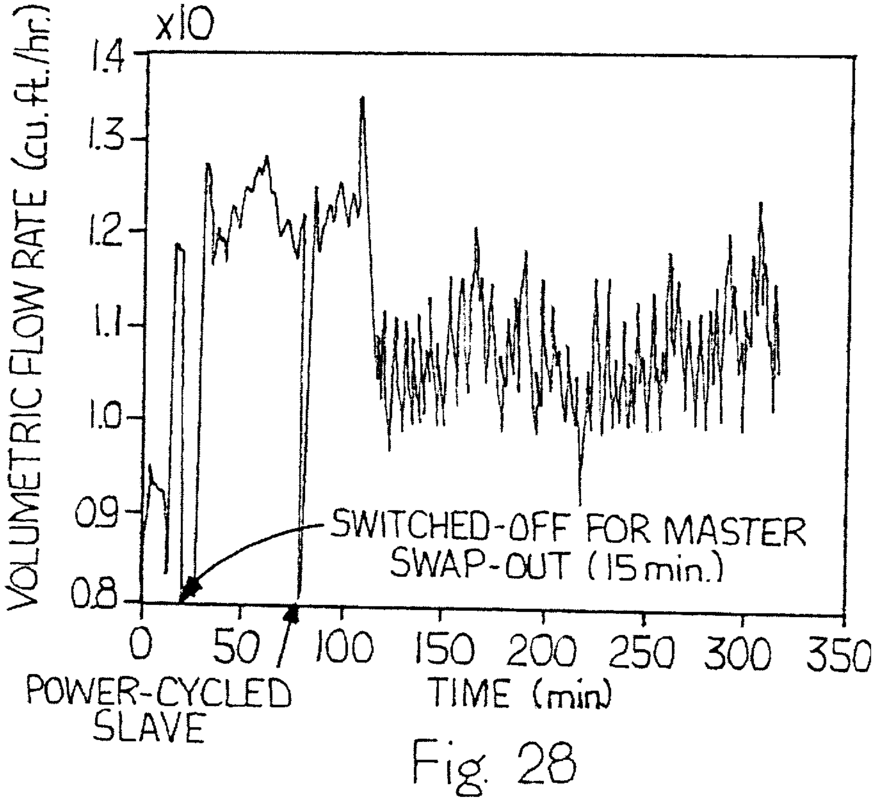
FIG. 28 is a chart illustrating volumetric flow rate versus time as determined by the system control mechanism according to the present invention.
Figure 29:
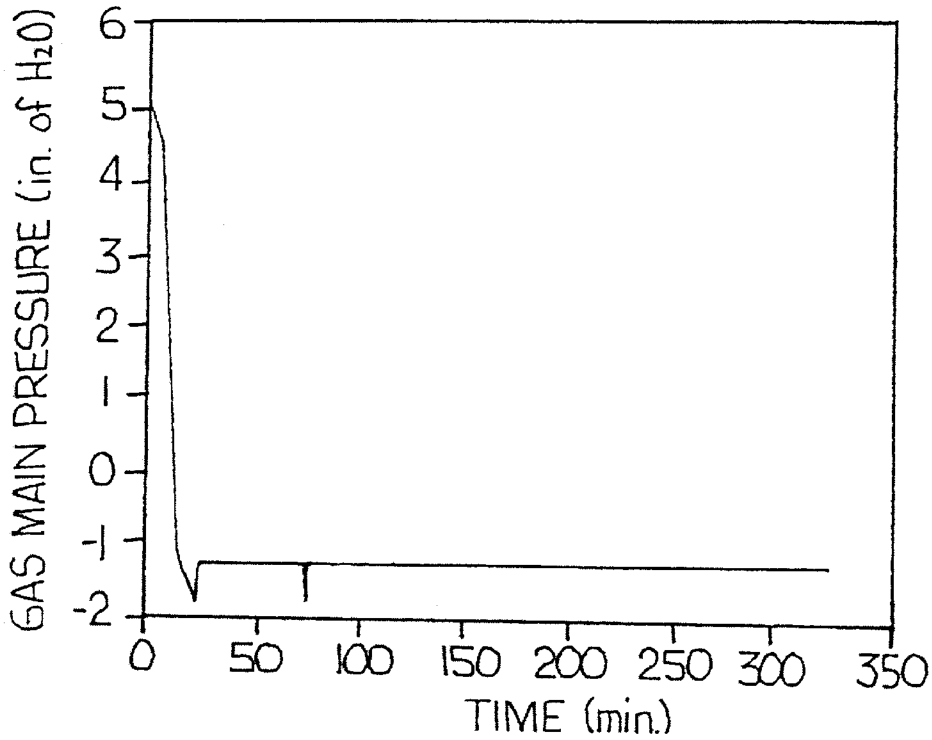
FIG. 29 is a chart illustrating material pressure versus time as determined by the system control mechanism according to the present invention.

The system control mechanism 24, whether centrally-located or portable, allows many conduit network 18 variables to be collected from various node element 12 locations. This data can then be displayed to the user in graphical form, including chart format. As seen in FIG. 27, flow speed is plotted as a function of time, which is one variable that a utility may wish to track, in particular the flow rate of natural gas through the mains. While flow speed is illustrated, it can be easily converted into flow rate based on an iterative procedure to determine flow type, whether laminar or turbulent, and the determination of flow rate may be based on the knowledge of node element 12 location, pressure, density, etc. If tracked at various days and locations, a computed flow rate may reveal the behavior as visually displayed in FIG. 28, which plots volume at flow rate versus time. The flow may have a cyclical or sinusoidal behavior, or any other behavior as a function of consumption and supply o that node element 12 location, which also varies by time of day, outside temperature, day of week, month of year, etc.

Figure 30:
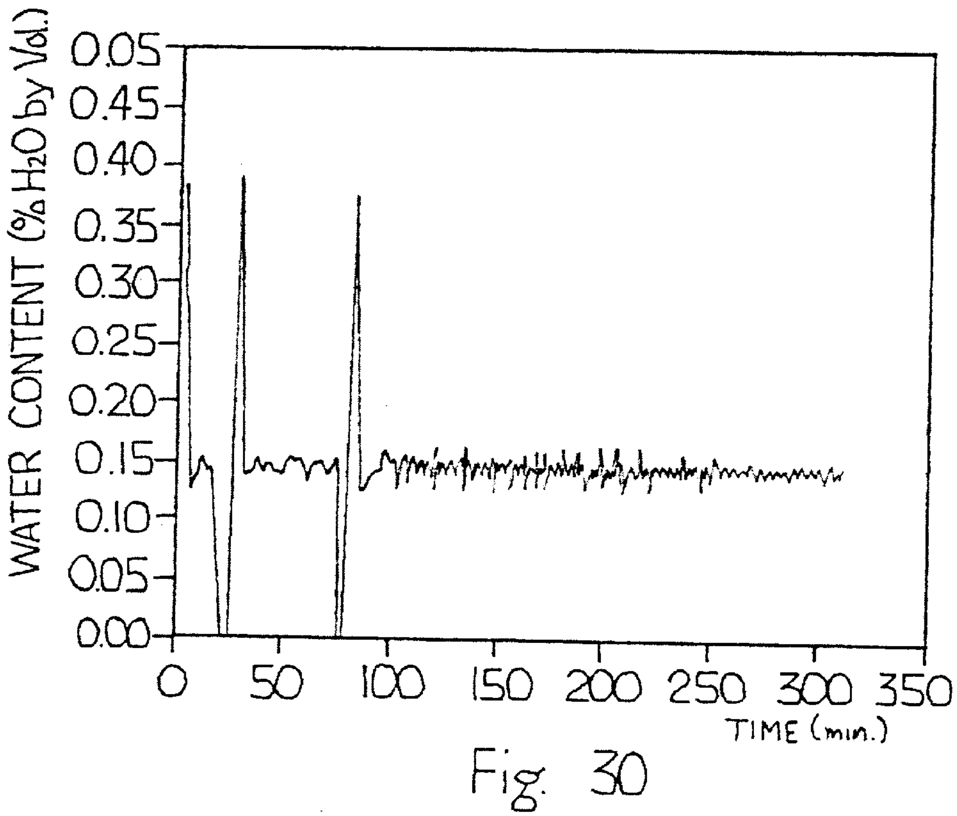
FIG. 30 is a chart illustrating water content versus time as determined by the system control mechanism according to the present invention.
Figure 31:
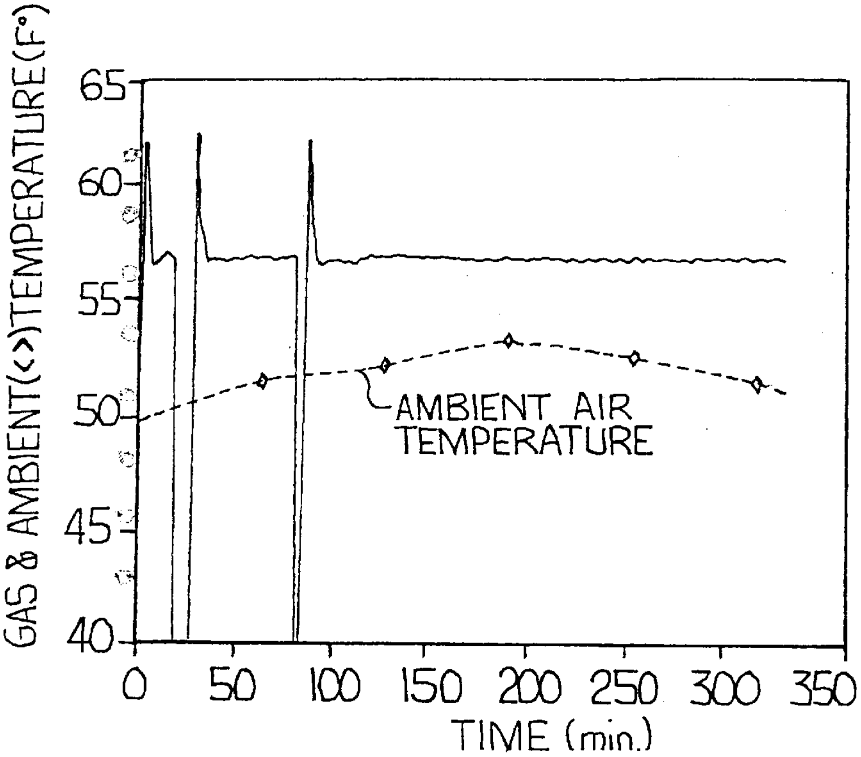
FIG. 31 is a chart illustrating material and ambient pressure versus time as determined by the system control mechanism according to the present invention.
Figure 32:
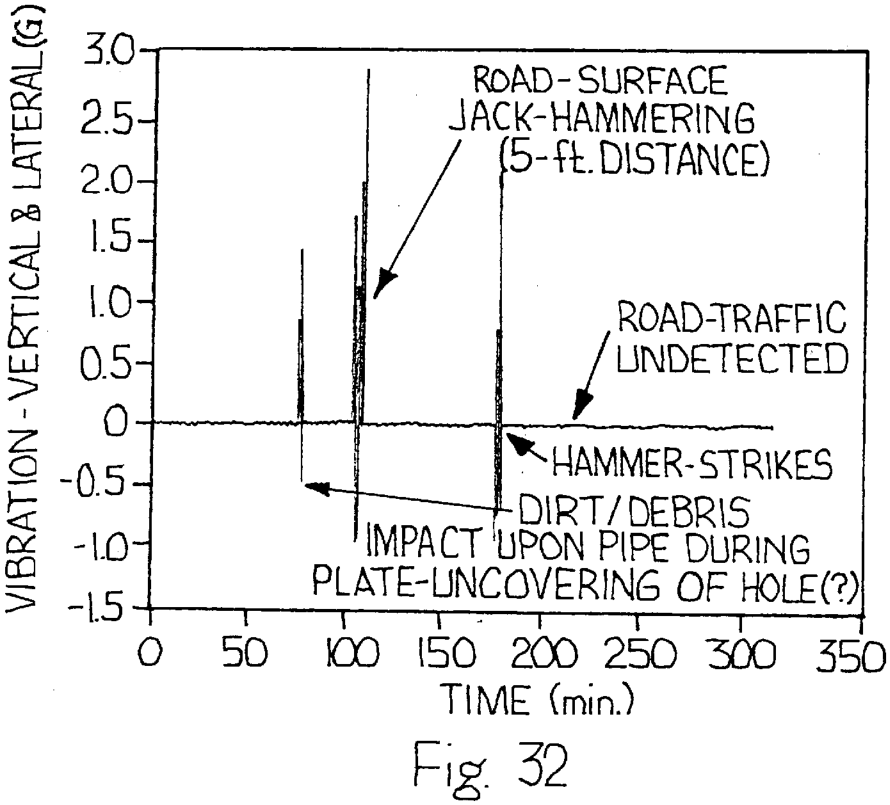
FIG. 32 is a chart illustrating vibration versus time as determined by the system control mechanism according to the present invention.

Again in the utility application, gas main pressure logs provide useful data for the user. An example of such pressure data versus time is illustrated in chart format in FIG. 29. Similarly, a user may wish to know the water content or water percentage in the material 20, as it directly relates to energy content of a gaseous material 20. This measurement would be gathered using the relative humidity sensor 106 of the sensor system 26, and converted using one of many standard conversion algorithms. A chart tracking water content percentage versus time is illustrated in FIG. 30. Material 20 temperature versus time is tracked in FIG. 31. Temperature data provides important information for algorithmic conversions and for predictions of potential leaking joints in the conduit network 18 due to subsoil freeze-thaw temperature cycles. In addition, the ambient air temperature can be tracked to compare the material 20 temperature with the outside temperature since leaking joints could be due to a freeze-thaw cycle.

Another interesting variable that can be tracked is conduit 16 vibration. Utilities may be interested in knowing whether external excitation (road traffic, excavator digging, etc.) could be detectable for tracking close, undesirable vibrational activity. Using the 2-(or 3-) axis accelerometer 98, vibration over time is plotted in a chart in FIG. 32. This information could be used in understanding undesirable third-party activity, conduit 16 breakage, failure, penetration or rupture due to outside vibration activity.

In this manner, the present invention provides a conduit network system 10 having a distributed network of node elements 12 with sensor systems 26 communicating in various formats on the real-time state of the conduit network 18 to a user, such as an operator. While a unique and unregulated means of communication is through the inner area 14 of the conduit 16, any form of hard-wired or wireless communication is envisioned. The conduit network system 10 provides improved and cost effective data acquisition, system monitoring and control. Further, the conduit network system 10 can detect damage and failure throughout the conduit network 18 and allow for the detection of possible future leaking areas. In addition, the conduit network system 10 allows for the design of and/or data source feed for the construction of a virtual model for system analysis and construction. The node elements 12 can be self-powered devices and may be implemented as keyhole-installable and/or keyhole-replaceable devices that are capable of measuring and communicating key process variables and data signals 22. Such variables can cover a wide range of operating parameters, depending upon the availability of appropriately positioned and accurate sensory devices.

The conduit network system 10 replaces costly and cumbersome daily, off-hour multi-station wireless or hard-wired data collection from numerous in-field sensor stations. Instead, the present conduit network system 10 allows for a single centrally-based data accumulation based on faster and less expensive communication systems. In addition, the data signals 22 can be received virtually instantaneously in order to track emergency conditions and allow for the appropriate reaction. This facilitates environmental management efforts and improves safety preparedness and emergency response efforts. In addition, this reduces the number of customer delivery complaints when used in the utility application.

The conduit network system 10 allows for the monitoring of third party access and proximity, thus allowing for the control of third party access and improving the understanding of incidents associated with this access. The compilation of accurate and distributed data sets allows for a simulation and modeling of future conduit networks 18. This, in turn, will allow for higher fidelity modeling efforts and improved design of future capacity expansion networks. In addition, the conduit network system 10 provides interaction and communication between not only the node elements 12 but other conduit control components 44 in the conduit network 18.

The conduit network system 10 can be used in monitoring any appropriate conduit network 18, for example, gaseous conduit systems directed to compressed air or air conditioning ducts, or any gaseous-media carrying conduit 16. Monitoring the conduit network 18 and infrastructure also allows for facility security, intruder warning or even camera sensing data relayed to the system control mechanism 24. The conduit network system 10 is easily expandable by adding node elements 12 at more and more locations throughout the conduit network 18. This allows for greater data collection and enhanced system integrity and design.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A conduit network system, comprising:

a plurality of spaced node elements in communication with an inner area of a conduit used to transfer material therein, each of the plurality of node elements configured to receive, process, communicate and relay data signals representative of user-desired information, wherein each node element is configured to wirelessly communicate with a subsequent node element; and a system control mechanism in communication with the at least one of the plurality of node elements and configured to receive the data signals from the at least one node element.

2. The conduit network system of claim 1, wherein the conduit is utilized to transfer material in at least one of a gaseous, liquid, aqueous, slurry and semi-solid form.

3. The conduit network system of claim 1, wherein at least one node element further includes a sensor system having at least one sensor device configured to sample at least one variable of at least one of the conduit, the material transferred through the conduit and an area adjacent the conduit and produce data signals representative of the at least one variable.

4. The conduit network system of claim 1, wherein the data signals received and processed by the at least one node element are communicated to at least one of the system control mechanism, another node element, a data extraction device and a memory storage medium in one of a wireless, hard-wired, memory medium, radio frequency, acoustic wave, fiber optic, cable, copper cable, telephone line, network line, telecommunications line, infrared and optical format.

5. The conduit network system of claim 1, wherein the data signals received and processed by at least one node element are transmitted through the inner area in the conduit.

6. The conduit network system of claim 5, wherein the conduit is constructed from a material that is one of reflective and conductive with respect to the data signals, such that the inner space of the conduit acts as a wave guide and wireless communications medium.

7. The conduit network system of claim 6, wherein the conduit is constructed from one of a metallic and semi-metallic material and the data signals are transmitted in the form of one of radio frequency signals and acoustic waves.

8. The conduit network system of claim 1, wherein the system control mechanism is in communication with at least one of a node element and a conduit control component configured to interact with at least one of the conduit, material transferred through the conduit and an area adjacent the conduit, the system control mechanism configured to transmit command signals to at least one node element and the conduit control mechanism.

9. The conduit network system of claim 8, wherein the conduit control component is one of a valve and a regulator.

10. The conduit network system of claim 1, wherein at least one node element further comprises a node control mechanism configured to at least one of receive, process and communicate data between at least one of the node element, sub-components of the node element, another node element, the system control mechanism, a sensor system, a communications network, a data extraction device and a memory storage medium.

11. The conduit network system of claim 1, wherein at least one node element is in communication with at least one power device configured to power at least one sub-component of the at least one node element.

12. The conduit network system of claim 11, wherein the at least one power device is located in at least one of:

(i) in an enclosure positioned in an aboveground location and accessible by a user;

(ii) in an aboveground location and in communication with a fixed power source via a hard line connection;

(iii) in an underground location; and (iv) in the inner area of the conduit, the power device configured to generate power using the energy of material transferred through the conduit.

13. The conduit network system of claim 12, wherein the power device is one of a generator, a battery, a fuel cell, a hard-wired electrical transfer device, a turbine and an in-flow power-generating device.

14. The conduit network system of claim 1, wherein at least one node element further comprises a transceiver and antenna arrangement for receiving, processing and transmitting the data signals.

15. The conduit network system of claim 1, wherein at least one node element further comprises:

(i) a sensor system having at least one sensor device configured to sample at least one variable of at least one of the conduit, the material transferred through the conduit and an area adjacent the conduit and produce data signals representative of the at least one variable; and (ii) a transceiver and antenna arrangement for receiving, processing and transmitting the data signals;

wherein the sensor system and the transceiver and antenna arrangement are at least partially housed in a wand enclosure projecting at least partially into the inner area of the conduit.

16. The conduit network system of claim 15, wherein the wand enclosure is configured to flex if struck by an impacting object and return to its original position after passage of the impacting object.

17. The conduit network system of claim 1, wherein the plurality of node elements each include a respective node control mechanism configured to:

(i) receive, process and communicate data between at least one of the node element, sub-components of the node element, another node element, the system control mechanism, a sensor system, a communications network, a data extraction device and a memory storage medium; and (ii) at least one of communicate with, identify and process commands regarding other node elements, thereby providing optimization functionality with respect to communications between the node elements and the system control mechanism.

18. The conduit network system of claim 1, wherein at least one node element is at least partially located within a protective housing.

19. The conduit network system of claim 18, wherein an inner area of the protective housing is evacuated, thereby forming a vacuum in the inner area, and one of blanketed with a gaseous material and immersed in a non-conductive fluid fully displacing any internal oxygen-containing gases.

20. The conduit network system of claim 18, further comprising an electrical barrier positioned in the protective housing and configured to isolate at least a portion of the node element from at least one of another portion of the node element and a power device.

21. The conduit network system of claim 1, wherein the data signals are representative of at least one of flow, pressure, relative humidity, acceleration, temperature, speed, material properties, material analysis, conduit properties, soil properties and conduit vibration.

22. The conduit network system of claim 1, wherein at least one node element further includes a node control mechanism comprising:

(i) a data acquisition module configured to receive the data signals from the at least one node element, sub-components of the node element, another node element, the system control mechanism, a sensor system, a communications network, a data extraction device and a memory storage medium;

(ii) a communications module configured to handle communications traffic between the at least one node element, sub-components of the node element, another node element, the system control mechanism, a sensor system, a communications network, a data extraction device and a memory storage medium; and (iii) an administration module configured to monitor and transmit data representative of node control mechanism status.

23. The conduit network system of claim 22, wherein the node control mechanism includes a plurality of work modes, including:

(i) an interactive mode configured to continuously receive, process and transmit the data signals;

(ii) a monitor mode configured to periodically receive, process and transmit the data signals;

(iii) a standby mode configured to receive, process and transmit the data signals when a user-defined threshold value is reached;

(iv) an emergency mode configured to receive, process and transmit the data signals when one of an alarm value is reached and an alarm action is initiated;

(v) a transparent mode configured to communicate with a user for engaging in configuration activities; and (vi) a self-test mode configured to perform a diagnostic test on the sub- components of the node element.

24. The conduit network system of claim 1, wherein at least one node element further includes:

(i) a sensor system having at least one sensor device configured to sample at least one variable of at least one of the conduit, the material transferred through the conduit and an area adjacent the conduit and produce data signals representative of the at least one variable; and (ii) an analog/digital converter configured to receive the data signals in an analog format from the sensor device and convert the data signals into a digital format.

25. The conduit network system of claim 1, wherein at least one node element is at least partially inserted into the inner area of the conduit.

26. The conduit network system of claim 1, wherein the system control mechanism is further configured to visually display a user interface for at least one of:

(i) displaying visual representations of the data signals; and (ii) permitting a user to interact with the system control mechanism.

27. A conduit network system node arrangement for use in connection with a conduit transferring material in an inner space thereof, the conduit network system node arrangement comprising:

(i) a sensor system having at least one sensor device configured to sample at least one variable of at least one of the conduit, the material transferred through the conduit and an area adjacent the conduit and produce data signals representative of the at least one variable;

(ii) a transceiver and antenna arrangement for receiving, processing and transmitting the data signals;

(iii) at least one power device configured to power at least one sub-component of the node arrangement; and (iv) a node control mechanism in communication with the sensor system, the transceiver and antenna arrangement and the power device, the node control mechanism configured to receive, wirelessly communicate and relay data signals to a subsequent node control mechanism;

wherein the node arrangement is at least partially located within a protective housing; and wherein the sensor system and the transceiver and antenna arrangement are housed in a wand enclosure capable of at least partially projecting into the inner area of the conduit.

28. A conduit network system, comprising:

a plurality of node arrangements as claimed in claim 27 in a networked relationship; and a control mechanism in communication with at least one of the plurality of node arrangements and configured to receive the data signals from the at least one node arrangement.

29. A method for communicating data in a conduit network, comprising the steps of:

collecting data at a first node;

transmitting the collected data to a subsequent node; and relaying the collected data from the subsequent node to a still further and subsequent node;

wherein the transmitted data is communicated through an inner area of a conduit in the conduit network.

30. The method of claim 29, wherein the data is transmitted via one of radio frequency waves and acoustic waves.

31. The method of claim 29, wherein the conduit is utilized to transfer material in at least one of a gaseous, liquid, aqueous, slurry and semi-solid form.

32. The method of claim 29, wherein the transferred material is natural gas.

33. A conduit network system, comprising:

at least one node element in communication with an inner area of a conduit used to transfer material therein, wherein the node element is configured to receive, process and communicate data signals representative of user-desired information; and a system control mechanism in communication with the at least one node element and configured to receive the data signals from the at least one node element, the system control mechanism further configured to visually display a user interface for at least one of: (i) displaying visual representations of the data signals; and (ii) permitting a user to interact with the system control mechanism.

* * * * *

UNITED STATES PATENT AND TRADEMARK OFFICE

CERTIFICATE OF CORRECTION

PATENT NO. : 6,778,100 B2
DATED : August 17, 2004
INVENTOR(S) : Schempf

It is certified that error appears in the above-identified patent and that said Letters Patent is hereby corrected as shown below:

Title page,
Item [75], Inventor, "Hagan Schempf" should read -- Hagen Schempf --;

Column 16,
Lines 54-55, "with the at least" should read -- with at least --
Line 56, "from the at least" should read -- from at least --

Column 17,
Line 2, "the at least" should read -- at least --

Column 20,
Line 4, "receive, wirelessly" should read -- receive, process, wirelessly --

Signed and Sealed this

Twenty-second Day of March, 2005

JON W. DUDAS
*Director of the United States Patent and Trademark Office*